United States Patent
Paleja et al.

(10) Patent No.: US 10,699,221 B2
(45) Date of Patent: *Jun. 30, 2020

(54) COLLABORATIVE TICKETING SYSTEM

(71) Applicant: Atom Tickets, LLC, Santa Monica, CA (US)

(72) Inventors: Ameesh Paleja, Santa Monica, CA (US); Alexander Rouse, Los Angeles, CA (US); Alan Raddatz, Seattle, WA (US); Kenley Capps, Irvine, CA (US); Matthew Bakal, Los Angeles, CA (US); Geoff Shaevitz, Los Angeles, CA (US); Michael Burns, Marina Del Rey, CA (US)

(73) Assignee: Atom Tickets, LLC, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/375,014

(22) Filed: Apr. 4, 2019

(65) Prior Publication Data
US 2019/0347581 A1    Nov. 14, 2019

Related U.S. Application Data

(63) Continuation of application No. 14/696,292, filed on Apr. 24, 2015, now Pat. No. 10,296,852.
(Continued)

(51) Int. Cl.
*G06Q 10/02* (2012.01)
*G06Q 50/00* (2012.01)
(Continued)

(52) U.S. Cl.
CPC .......... *G06Q 10/02* (2013.01); *G06F 3/0482* (2013.01); *G06F 3/04842* (2013.01);
(Continued)

(58) Field of Classification Search
CPC .... G06Q 10/02; G06Q 30/0631; G06Q 50/01; G06Q 30/0269; G06Q 30/0641;
(Continued)

(56) References Cited

U.S. PATENT DOCUMENTS

| 6,070,186 A | 5/2000 | Nishio |
| 9,058,627 B1 | 6/2015 | Wasser et al. |

(Continued)

FOREIGN PATENT DOCUMENTS

| JP | 2008130014 A | 6/2008 |
| KR | 2013/0020385 A | 2/2013 |

(Continued)

OTHER PUBLICATIONS

International Search Report and Written Opinion dated Feb. 2, 2016 in International Application No. PCT/US15/61381, filed Nov. 18, 2015 (of-record in parent application).
(Continued)

*Primary Examiner* — Igor N Borissov
(74) *Attorney, Agent, or Firm* — Knobbe, Martens, Olson & Bear, LLP

(57) ABSTRACT

Features are disclosed relating to a collaborative ticketing system that manages various aspects of ticketing for events (e.g., movies, concerts, sporting events, and the like) using knowledge about the contacts, friends, and other social connections of system users. The collaborative ticketing system may generate dynamic ticket offers that are based on the number of friends, invited by users, ultimately obtaining tickets. The collaborative ticketing system can also streamline the procurement of concessions and other event-related items by allowing users to pre-purchase such items (e.g., in connection with ticket offers), and then pick up the items at the event venue with little or no wait. In addition, users can preview event-related content (e.g., movie trailers) for event (Continued)

providers (e.g., movie studios), and answer questions or otherwise provide feedback about the event-related content in return for special offers, rewards, and other considerations.

21 Claims, 15 Drawing Sheets

Related U.S. Application Data

(60) Provisional application No. 62/082,498, filed on Nov. 20, 2014.

(51) Int. Cl.
| | |
|---|---|
| *G06Q 30/02* | (2012.01) |
| *G06Q 30/06* | (2012.01) |
| *G06F 3/0482* | (2013.01) |
| *G06F 3/0484* | (2013.01) |
| *G06F 3/0485* | (2013.01) |
| *G06F 3/0488* | (2013.01) |
| *G06K 7/14* | (2006.01) |
| *G06K 19/06* | (2006.01) |

(52) U.S. Cl.
CPC ...... *G06F 3/04855* (2013.01); *G06F 3/04883* (2013.01); *G06K 7/1417* (2013.01); *G06K 19/06037* (2013.01); *G06Q 30/0203* (2013.01); *G06Q 30/0205* (2013.01); *G06Q 30/0245* (2013.01); *G06Q 30/0269* (2013.01); *G06Q 30/0603* (2013.01); *G06Q 30/0631* (2013.01); *G06Q 30/0641* (2013.01); *G06Q 50/01* (2013.01)

(58) Field of Classification Search
CPC ............. G06Q 30/0603; G06Q 20/322; G06Q 20/3224; G06F 3/0482; G06F 3/04883; G06F 3/04855; G06F 3/04842
USPC .......................................................... 705/5
See application file for complete search history.

(56) References Cited

U.S. PATENT DOCUMENTS

| | | | |
|---|---|---|---|
| 9,747,559 | B2 | 8/2017 | Paleja et al. |
| 2002/0091555 | A1 | 7/2002 | Leppink |
| 2004/0203909 | A1 | 10/2004 | Koster |
| 2006/0173838 | A1 | 8/2006 | Garg et al. |
| 2006/0174274 | A1 | 8/2006 | Vance |
| 2007/0233635 | A1 | 10/2007 | Burfeind et al. |
| 2007/0233736 | A1 | 10/2007 | Xiong et al. |
| 2008/0015983 | A1 | 1/2008 | Spikes |
| 2008/0098313 | A1 | 4/2008 | Pollack |
| 2008/0122796 | A1 | 5/2008 | Jobs et al. |
| 2008/0154623 | A1 | 6/2008 | Derker et al. |
| 2008/0169937 | A1 | 7/2008 | Lowry |
| 2008/0308638 | A1 | 12/2008 | Hussey |
| 2009/0048923 | A1 | 2/2009 | Seven et al. |
| 2009/0178118 | A1 | 7/2009 | Cedo et al. |
| 2010/0071000 | A1 | 3/2010 | Amento et al. |
| 2010/0082374 | A1 | 4/2010 | Charania |
| 2010/0082491 | A1 | 4/2010 | Rosenblatt et al. |
| 2010/0131366 | A1 | 5/2010 | Gibson |
| 2010/0306815 | A1 | 12/2010 | Emerson et al. |
| 2011/0246369 | A1 | 10/2011 | de Oliveira et al. |
| 2011/0302117 | A1 | 12/2011 | Pinckney |
| 2012/0084309 | A1* | 4/2012 | Schumann ............ G06Q 10/06 707/758 |
| 2012/0238243 | A1 | 9/2012 | Rao |
| 2012/0259668 | A1 | 10/2012 | LeBeau |
| 2012/0290340 | A1 | 11/2012 | Ramanujam et al. |
| 2012/0324374 | A1 | 12/2012 | Karmon |
| 2013/0013383 | A1 | 1/2013 | Vitti et al. |
| 2013/0096961 | A1 | 4/2013 | Owens et al. |
| 2013/0097180 | A1 | 4/2013 | Tseng |
| 2013/0138643 | A1 | 5/2013 | Ramanathan et al. |
| 2013/0151292 | A1 | 6/2013 | Van Deloo et al. |
| 2013/0167168 | A1 | 6/2013 | Ellis |
| 2013/0227086 | A1 | 8/2013 | Stout |
| 2013/0238370 | A1 | 9/2013 | Wiseman et al. |
| 2013/0282421 | A1 | 10/2013 | Graff et al. |
| 2013/0311918 | A1 | 11/2013 | McCoy |
| 2014/0047023 | A1 | 2/2014 | Baldwin et al. |
| 2014/0074866 | A1 | 3/2014 | Shah et al. |
| 2014/0108494 | A1 | 4/2014 | Kahlert et al. |
| 2014/0115057 | A1 | 4/2014 | O'Sullivan |
| 2014/0156746 | A1 | 6/2014 | Wheatley |
| 2014/0157200 | A1 | 6/2014 | Jeon |
| 2014/0171039 | A1 | 6/2014 | Bjontegard |
| 2014/0289678 | A1 | 9/2014 | Carmichael |
| 2014/0297739 | A1 | 10/2014 | Stein |
| 2015/0006209 | A1 | 1/2015 | Busquiel et al. |
| 2015/0007045 | A1 | 1/2015 | Salyers |
| 2015/0039549 | A1 | 2/2015 | Aufmann et al. |
| 2015/0066546 | A1 | 3/2015 | Scarborough et al. |
| 2015/0067064 | A1 | 3/2015 | Abercrombie, III |
| 2015/0095777 | A1 | 4/2015 | Lim et al. |
| 2015/0193819 | A1 | 7/2015 | Chang |
| 2015/0242895 | A1 | 8/2015 | Brown et al. |
| 2015/0271631 | A1 | 9/2015 | Porter |
| 2016/0148122 | A1 | 5/2016 | Paleja et al. |
| 2016/0148124 | A1 | 5/2016 | Paleja et al. |
| 2016/0148125 | A1 | 5/2016 | Paleja et al. |
| 2016/0148126 | A1 | 5/2016 | Paleja et al. |
| 2016/0173436 | A1* | 6/2016 | Koolwal ................ G06Q 50/01 709/206 |
| 2018/0032997 | A1* | 2/2018 | Gordon ............. G06Q 20/3224 |

FOREIGN PATENT DOCUMENTS

| | | |
|---|---|---|
| WO | WO 2012/004599 A1 | 1/2012 |
| WO | WO 2013/192507 A2 | 12/2013 |

OTHER PUBLICATIONS

PR Newswire, "Evite Selected as Fandango's Online Invitation Service; Invitation to Feature Comprehensive Movie Information and Link to Buy Tickets," PR Newswire Association LLC, May 19, 2004 (of-record in parent application).

* cited by examiner

COLLABORATIVE TICKETING SYSTEM

PRIORITY CLAIM

This application is a continuation of U.S. application Ser. No. 14/696,292, filed Apr. 24, 2015, which claims the benefit of U.S. Provisional Patent Application No. 62/082,498, filed Nov. 20, 2014. The disclosures of the aforesaid applications are hereby incorporated by reference herein.

BACKGROUND

Ticketing services allow users to obtain information regarding events, such as movies, concerts, sporting contests, performances, and the like, and to purchase tickets for those events. In a common implementation, a ticketing service provides a web-based or telephonic interface that allows users to select events, determine whether tickets are available (and, if reserved seating is used for the event, which seats are available). Users can then complete the purchase of one or more tickets for the event (e.g., for family and/or friends), purchase tickets for additional events, and the like.

Some ticketing services allow a user to obtain information about an event together with information regarding whether any friends of the user have also purchased tickets to the event. For example, users may register for a ticketing service and self-identify as friends. Users can then access information about which friends are attending an event, and users can use that information to decide whether to attend the event individually or purchase tickets near the user's friends.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Introduction

Figure 1:
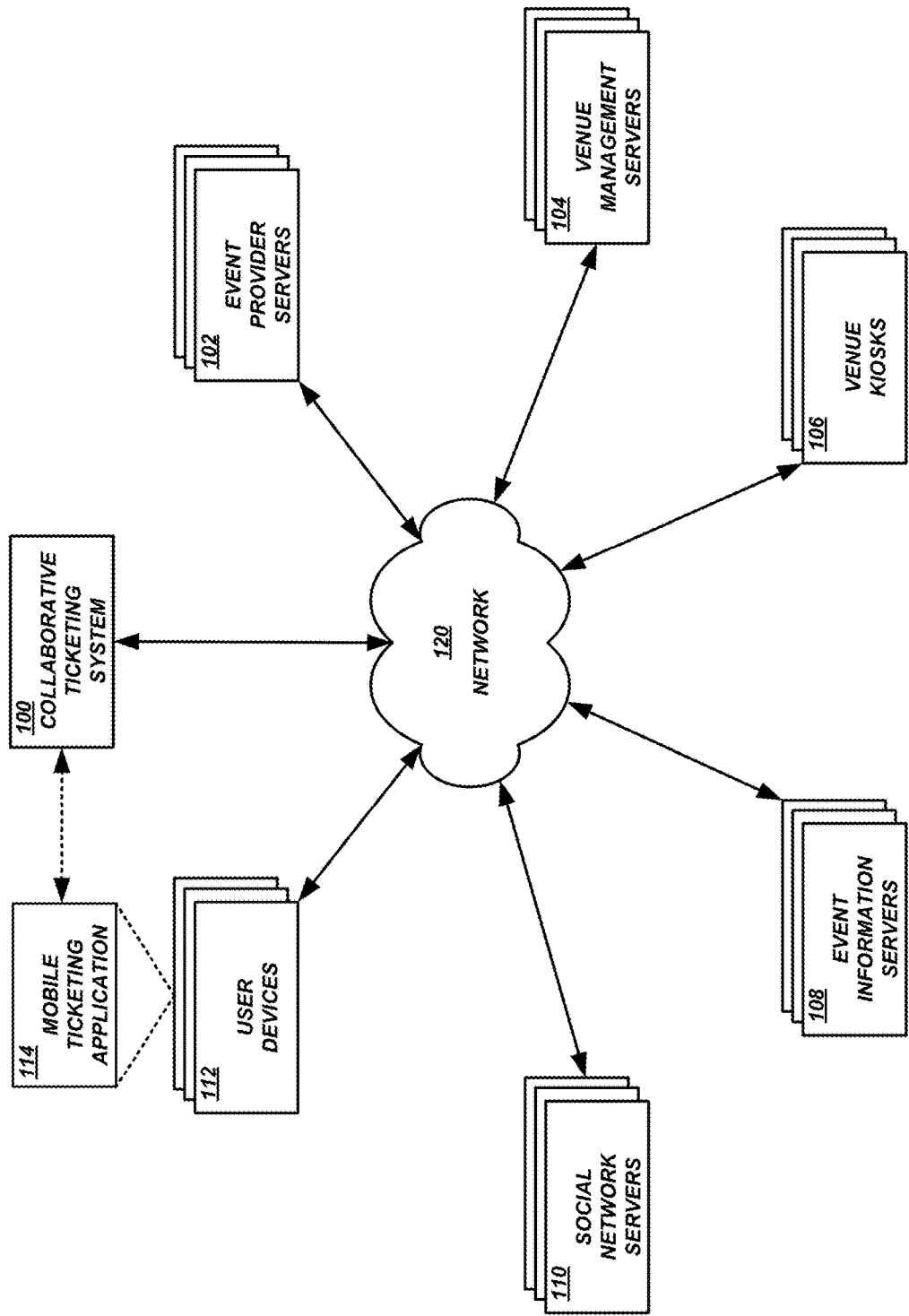
FIG. 1 illustrates a network environment with a collaborative ticketing system, user devices, and various servers and devices according to some embodiments.

The present disclosure is directed a collaborative ticketing system that manages various aspects of ticketing for events (e.g., movies, concerts, sporting events, and the like) using knowledge about the contacts, friends, and other social connections of system users. The collaborative ticketing system may generate offers for users, and the ticket prices eventually paid by the users may be reduced when friends, invited by the users, also purchase tickets. The collaborative ticketing system can also streamline the purchase and procurement of concessions and other event-related items by allowing users to pre-purchase such items (e.g., in connection with ticket offers), and then pick up the items at the event venue with little or no wait. In addition, users can preview event-related content (e.g., movie trailers) for event providers (e.g., movie studios), and answer questions or otherwise provide feedback about the event-related content in return for special offers, rewards, and other considerations. The collaborative ticketing system can track any or all aspects of event browsing, previewing, ordering, and attendance, along with the social connections associated therewith, and can generate data and reports useful in, e.g., creation of future offers, previews, and the like.

Some conventional ticketing services allow a user to obtain information about an event together with information regarding whether any friends of the user have also purchased tickets to the event. The user can then decide whether to attend the event individually or purchase tickets near the user's friends. The user may also be allowed to purchase blocks of tickets and then share the purchased tickets with friends. However, such conventional services do not recommend events and/or friends to invite to events based on observed event-related behaviors of the user and the friends (e.g., browsing events, viewing previews or other event-related content, attending events with other users, etc.), nor do such conventional services offer variable pricing based upon the invited friends that subsequently purchase tickets. Rather, users are passively shown a listing of friends that have also purchased tickets to the event, and the users are enabled to purchase tickets near those friends.

Some aspects of the present disclosure relate to the generation and management of ticket offers based on determined user preferences, social connections, event characteristics, and/or other user-related or event-related information. Ticket offers may include various parameters, such as a list price that corresponds to the price of the tickets independent of any special offer, a base price that corresponds to the starting price of the tickets in connection with the offer, a discount amount or function that corresponds to the discount applied to offered tickets when friends also purchase tickets, and, in some cases, a floor that corresponds to the lowest amount the tickets will be sold for in connection with the offer. Accordingly, users are encouraged to invite friends to the events in order to obtain the maximum benefit from the offers. In addition, users may be more likely to attend an event in general when the user actively invites friends to the event or is invited by friends attending the event. Thus, a collaborative ticketing system implementing offers tied to or otherwise based on the social connections of users and the conversion of those connections into ticket sales can increase overall ticketing sales and revenue in comparison with a system that passively indicates which friends have purchased tickets to an event of interest.

Users may also purchase concessions or other event-related items in connection with the purchase of tickets. For example, a particular user purchasing tickets to a movie may typically buy popcorn and a beverage at the movie theater to consume while watching the movie. Using the collaborative ticketing system, the user can pre-purchase the concessions with the movie ticket, and may in some cases get a further discount on the concessions and/or ticket. In addition, or alternatively, the concession stand at the theater may receive a notification when the user arrives at the event (e.g., when the user scans an e-ticket or uses near-field communication at a theater kiosk). Concession stand employees may then prepare the pre-purchased concessions and have them ready for pickup when the user arrives at the concession stand. In this way, the user can save time by avoiding payment lines and other potential delays associated with in-person ordering of concessions. In addition, the concession stands can more efficiently and effectively plan for expected demand by having advance access to information about pre-paid concession sales tied to particular tickets.

Additional aspects of the disclosure relate to methods of generating offers and/or determining ticket pricing for the offers. The collaborative ticketing system may obtain information from event providers (e.g., movie studios, movie distributors, event promoters, or other event producers), event venues (e.g., movie theaters, concert halls, stadiums, or other event host locations), and the like. Such information may be used to determine ticket pricing and generate offers. In some embodiments, prices may be determined based on analysis of multiple (e.g., two or more) variables, such as the date of the showing relative to the initial release of the movie, historical sales of similar tickets, market-based factors, competing movies, movie studio and/or theater desire for incremental sales, and the like. For example, a popular movie with little competition near the beginning of its theater run may be discounted lightly from the list price, if at all, and little or no discount may be given for friends also purchasing tickets. However, a less popular movie with much competition near the end of its theater run in a relatively lower-price geographic region may be discounted deeply, and aggressive additional discounts may be offered for each friend that purchases a ticket, for concessions purchased in connection with the event, etc. In addition, if the movie studio that produced the movie and/or the theater at which the movie is showing is primarily interested in marginal sales at the end of the movie's run in theaters, the collaborative ticketing system may generate bundled offers that include tickets and concessions for a single price, and the revenue from such bundled offers may be intelligently split among the movie studio and movie theater to increase overall profits by virtue of the marginal ticket sale and additional concession revenue.

Further aspects of the present disclosure relate to generation of invitations, such as user-initiated invitations or polls to friends, to organize group outings to events. Invitations may also or alternatively be generated automatically according to the determined preferences of individual users, social connections between users, characteristics of the events to which the invitations pertain, environmental information, information from third-party sources, and the like. In some embodiments, a user may select or otherwise express interest in multiple events and/or offers, and may wish to purchase one of the tickets/offers depending upon the availability and input of friends. The user may select and/or be recommended friends whom may also be interested in the events or offers, and those friends can be invited to participate in a poll. After the voting is complete (or in response to some other event, such as the expiration of a period of time), the event or offer with the most votes may be chosen, and the various users can proceed to purchase tickets if desired. As another example, geo-location information may be obtained by the collaborative ticketing system for a group of friends. The geo-location information may indicate that the individuals are currently near a movie theater. The collaborative ticketing system may determine that the theater has an upcoming showing of a movie in which some or all of the friends have shown an interest (e.g., via favorable feedback regarding a preview, interest in or previous attendance at similar movies, etc.). Furthermore, the collaborative ticketing system may determine that there is adverse weather in the area (e.g., high heat, expected precipitation, etc.). Based on any or all of these factors, the collaborative ticketing system can generate an invitation to the users, including an offer to see the movie at a discount that increases with the total number of friends that purchase a ticket, the purchase of concessions, and/or other factors. The collaborative ticketing system may also or alternatively generate concessions offers, offers for combinations of concessions and tickets, etc. in response to determining that a user or group of users is within geographic proximity of a venue.

Still further aspects of the present disclosure relate to providing event previews and soliciting feedback regarding the event previews. Users may be shown movie trailers or other event previews provided by movie studios or other event producers, and the users can be prompted to provide feedback regarding the previews. Event producers can use such feedback information to test the effectiveness of different versions of previews, test the interest level of particular user groups (e.g., demographics) in particular preview versions, test the interest level in particular events relative to competing events, etc. In addition, the collaborative ticketing system can collect the user feedback information to develop user profiles or determine user preferences. Such user preferences may be useful in determining which movies and other events to recommend to the user, which invitations to automatically generate, which friends to recommend for particular events, etc.

Yet further aspects of the disclosure relate to user interface features that provide users with an intuitive ticketing experience. In some embodiments, a graphical user interface may be generated on a user device, and a user of the device can browse events and offers, configure invitations, and the like using the interface. The interface may include a dynamic control, such as a "wheel" with multiple regions. The regions may correspond to different event categories, different offer types, some combination thereof, etc. In addition, the sizes of the regions with respect to one another may be based on the relative importance to the user or strength of correlation to the user, the amount of content associated with the regions, etc.

Although aspects of the embodiments described in the disclosure will focus, for the purpose of illustration, on ticketing for movies shown at movie theaters and for concessions offered at movie theaters, one skilled in the art will appreciate that the features disclosed herein may be applied to any number of other events occurring at venues. For example, the features disclosed herein may be applied to concerts, sporting events, expositions, performances, and other entertainment events to which multiple attendees purchase tickets, other types of merchandise at such events, etc. Such events may occur at various theaters, sporting arenas, convention centers, parks, etc.

Various aspects of the disclosure will now be described with regard to certain examples and embodiments, which are intended to illustrate but not limit the disclosure.

Network Ticketing Environment and System Components

FIG. 1 illustrates an example network environment in which features can be implemented for providing collaborative ticketing for events, such as movies, concerts, sporting events, and the like. The network environment can include various devices, systems, services, and the like in communication via one or more networks 120. The network 120 may be a publicly accessible network of linked networks, possibly operated by various distinct parties, such as the Internet. In other embodiments, the network 120 may include a private network, personal area network, local area network, wide area network, cable network, satellite network, cellular telephone network, etc. or combination thereof, any or all of which may or may not have access to and/or from the Internet.

As shown, the network environment can include: a collaborative ticketing system 100 to manage ticket pricing and ordering, event previews and invitations to friends, and other processes; event provider servers 102 to provide information about events, such as information about movies and movie previews, and to receive information from the collaborative ticketing system 100, such as information about ticket sales and user reactions to previews; venue management servers 104 to provide information about the dates, times, and locations at which events are to occur, and to receive information from the collaborative ticketing system 100 about ticket orders and related purchases such as concessions; venue kiosks 106 to provide information about user check-ins with purchased tickets; third-party event information servers 108 to provide event-related information, such as movie reviews and venue reviews; social network servers 110 to provide information about social connections and other relevant social information, such as user profiles and the identity of users' friends; and user devices 112 that may be used by users to view event offers, place orders, generate invitations, view previews, and the like. Illustratively, a user of a user device 112 may interact with a mobile ticketing application 114 executing on the user devices 112 to perform various collaborative ticketing functions described herein. Alternatively, or in addition, a user may interact with a browser-based interface to perform the various collaborative ticketing functions, such as content site (e.g., a "web site" with various "web pages"), a hosted application, or some other interface provided by the collaborative ticketing system and accessed via a browser application executing on the user device 112.

The devices, entities, services and features described above are illustrative only, and are not intended to be limiting. Any or all of the devices, entities, services and the like described above and shown in FIG. 1 may perform fewer, additional, and/or alternative functions. In some embodiments, fewer, additional, and/or alternative devices, entities, and services may be part of or otherwise associated with a networked collaborative ticketing environment.

As will be appreciated by those of skill in the relevant art, the network environment may include any number of distinct event provider servers 102, venue management servers 104, venue kiosks 106, event information servers 108, social network servers 110, and user devices 112. In addition, multiple (e.g., two or more) collaborative ticketing systems 100 may be used. For example, separate collaborative ticketing systems 100 may be located so that they are close (in either a geographical or networking sense) to groups of current or potential user devices 112 or venue management servers 104. In such a configuration, a user device 112 may establish communications with the collaborative ticketing system 100 to which it is closest, rather than all user devices 112 requesting content via a collaborative ticketing system 100. Illustratively, the event provider servers 102, venue servers 104, event information servers 108, and social servers 110 may each correspond to logical associations of one or more computing devices configured to provide information and functionality described herein.

Figure 2:
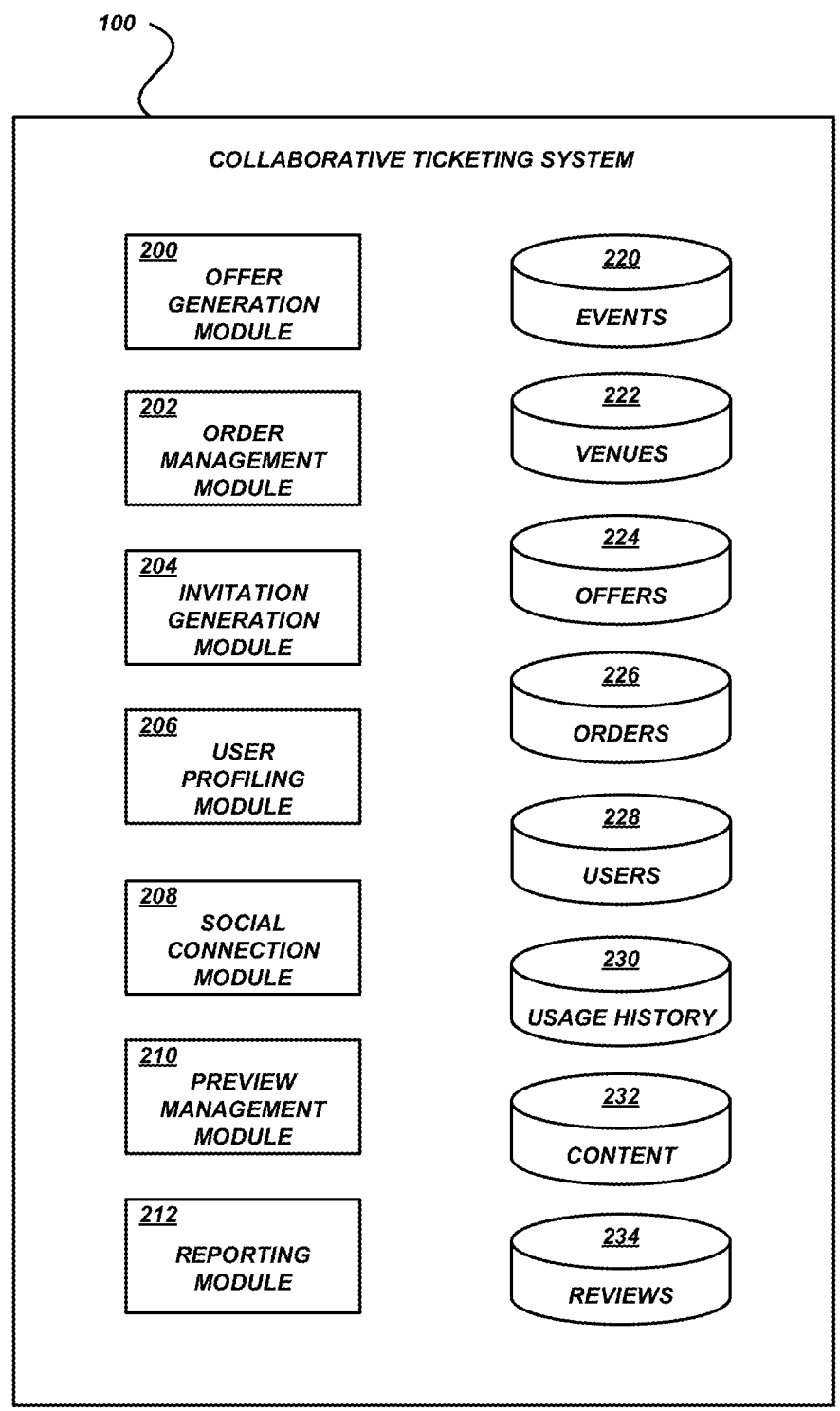
FIG. 2 illustrates an example collaborative ticketing system according to some embodiments.

FIG. 2 shows an illustrative collaborative ticketing system 100. The collaborative ticketing system 100 can be a physical server or group of physical servers that may be accessed via one or more networks, such as network 120. As shown, the collaborative ticketing system 100 may include various modules, components, data stores, and the like to provide the ticketing, pricing, analysis, and other features described herein. For example, the collaborative ticketing system 100 may include: an offer generation module 200 to generate pricing and offers; an order management module 202 to process user interactions and configure orders; an invitation generation module 204 to generate and manage user-initiated or automatically-initiated event invitations; a user profiling module 206 to determine user preferences based on order history, system usage, and/or various other factors; a social connection module 208 to identify social connections and recommend friends; a preview management module 210 to enable event production entities to define previews (e.g., content and survey questions) and facilitate presentation of the previews to users; and a reporting module 212 to generate and provide reports regarding system 100 usage, user preferences, offer performance, etc. In addition, the collaborative ticketing system 100 may include various data stores, such as: an events data store 220 to store information about events (e.g., movies, concert tours, and the like offered by event providers 102); a venues data store 222 to store information about venues (e.g., movie theaters, concert halls, sporting stadiums etc.); an offers data store 224 to store information about offers, pricing, and the like; an order data store 226 to store information about pending and/or finalized orders; a users data store 228 to store user profile and preference information; a usage history data store 230 to store information about system usage, such as usage of client-side application interactions (e.g., click stream information regarding interactions performed at user devices 112, such as interactions with the mobile ticketing application 114) or server-side applications (e.g., web page requests); a content data store 232 to store event-related content, such as previews, and information solicited about the content; and a reviews data store 234 to store user reviews and other information regarding events attended by the users. In some embodiments, the collaborative ticketing system 100 may include fewer, additional, and/or alternative additional modules, components, data stores, and the like that those illustrated in FIG. 2. For example, the collaborative ticketing system 100 may include a web server that serves event-related content and/or an interface accessible via browser applications on user devices 112.

The collaborative ticketing system 100 may be a single computing device, or it may include multiple distinct computing devices, such as computer servers, logically or physically grouped together to collectively operate as a server system. The components of the collaborative ticketing system 100 can each be implemented as hardware, such as a server computing device, or as a combination of hardware and software. In addition, the modules and components of the collaborative ticketing system 100 can be combined on one server computing device or separated individually or into groups on several server computing devices. In some embodiments, the features and services provided by the collaborative ticketing system 100 may be implemented as web services consumable via the communication network 120. In further embodiments, the collaborative ticketing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 3:
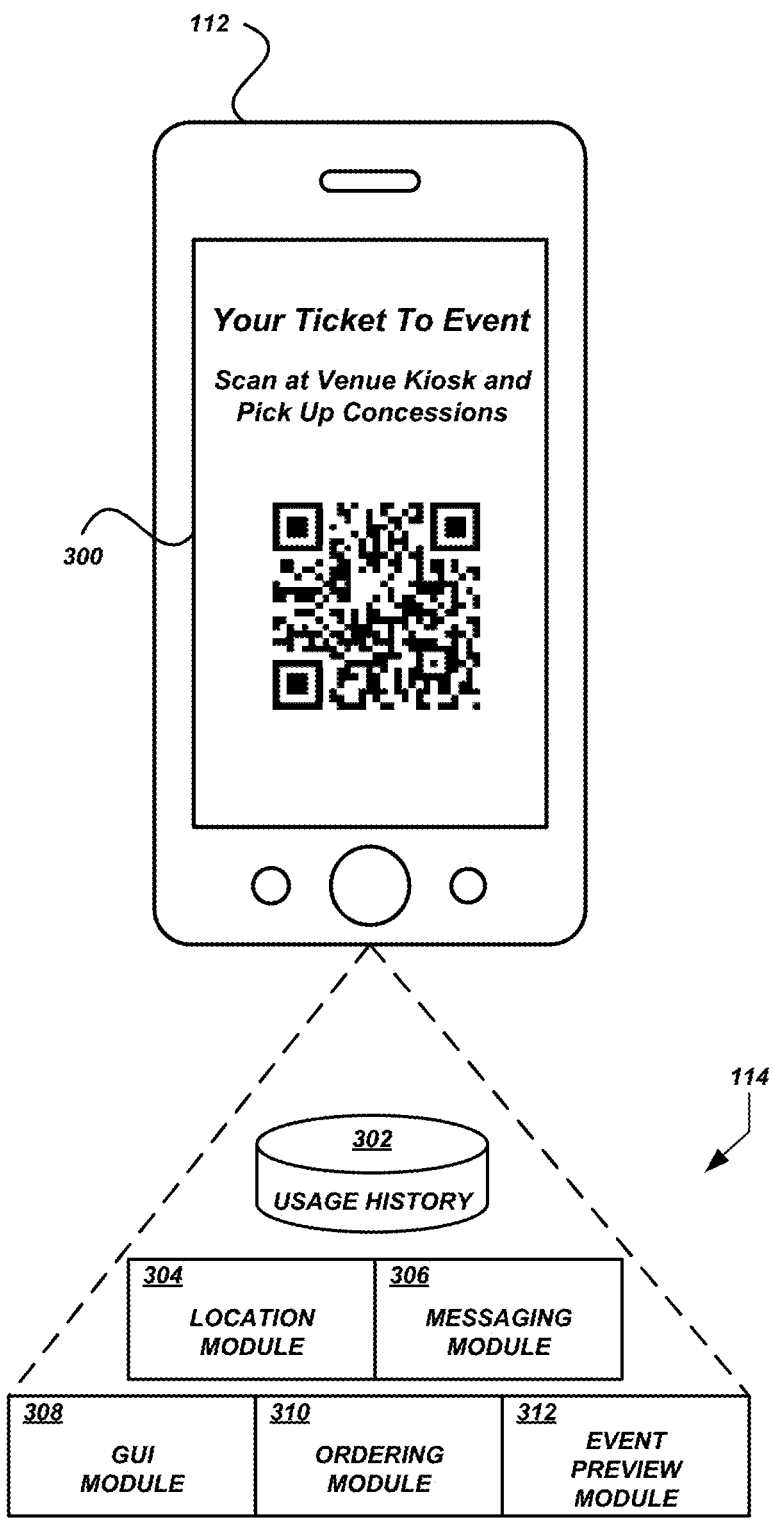
FIG. 3 illustrates an example user device according to some embodiments.

FIG. 3 shows an example user device 112 according to some embodiments. The user device 112 may be any of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 112 may execute a so-called "thick client" application and/or a "thin client" application (such as a browser application) to communicate with other computing systems, such as the collaborative ticketing system 100, venue kiosks 106, and the like.

As shown, a user device 112 may have various modules and components that facilitate or provide the features described herein, including a display 300, such as a video output display to provide a graphical user interface, show ticketing information, etc., and a mobile ticketing application 114 to facilitate the various collaborative ticketing functions described herein. The mobile ticketing application 114 may include or otherwise have access to: a usage history data store 302 to store information about user interactions with the graphical user interface associated with collaborative ticketing and/or user interactions with the device in general; a location module 304 such as a global positing system ("GPS") antenna and corresponding components to determine the current geographic location of the user device 112; a messaging module 306 to receive notifications from the collaborative ticketing system 100, communicate with other users, and the like; a graphical user interface ("GUI") module 308 to generate and manage user interactions with an interface for browsing offers and previews, purchasing tickets, and the like; a group event processing or ordering module 310 to handle order and invitation configuration and finalization; and an event preview module 312 to present event previews, obtain user feedback, provide information regarding rewards, etc. In some embodiments, a user device 112 may include fewer, additional, and/or alternative modules, components, and/or data stores than those illustrated in FIG. 3.

Figure 4:
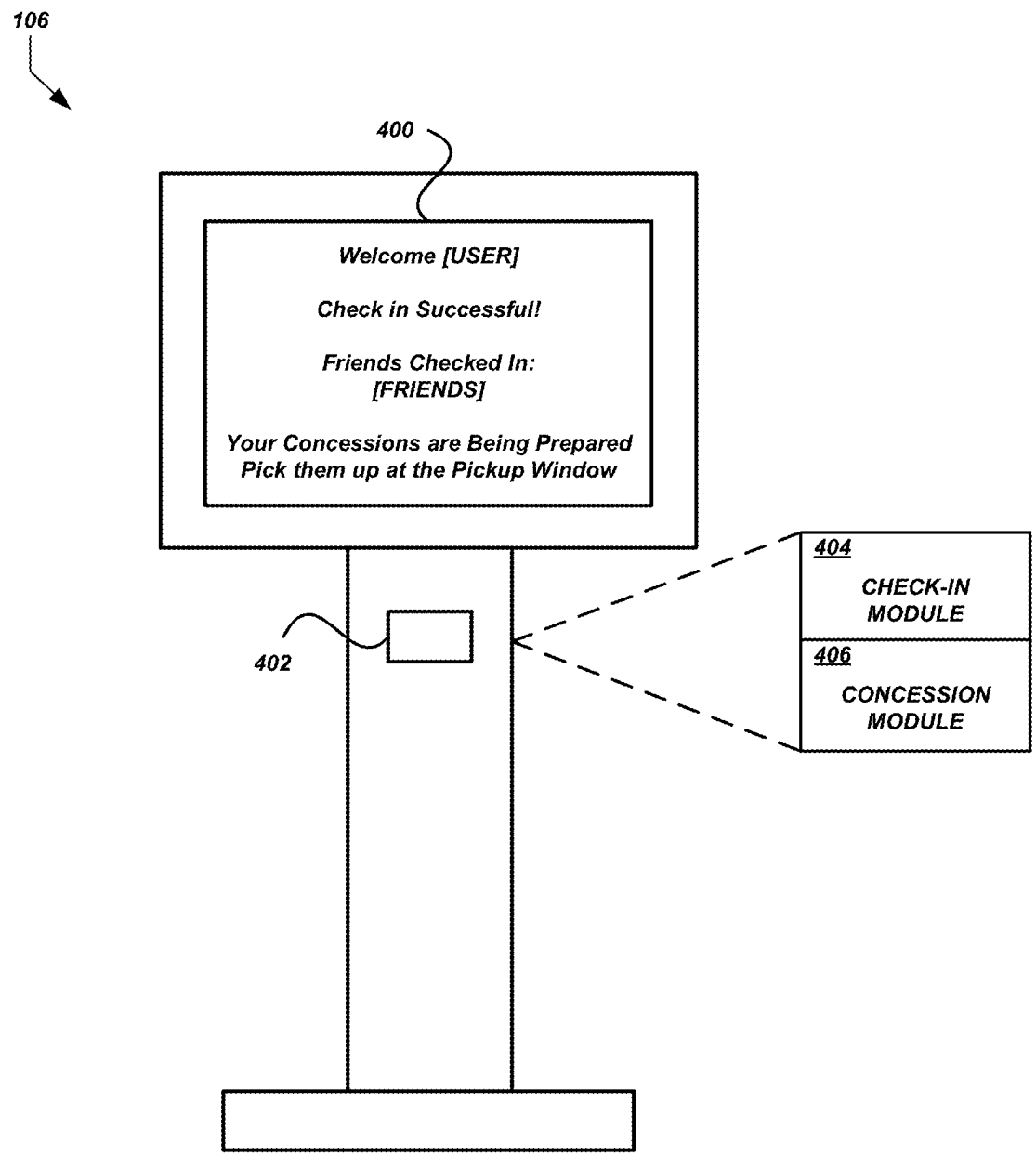
FIG. 4 illustrates an example venue kiosk according to some embodiments.

FIG. 4 shows an example venue kiosk 106 according to some embodiments. The kiosk 106 may be or include a computing device, such as a tablet computing device or some other computing device with one or more computer processors, a memory with executable instructions, network connectivity, and various input/output devices. For example, the kiosk 106 may include a display 400 to prompt users with instructions and/or provide information, and a sensor 402 to scan tickets and/or receive data from a user device 112. In addition, as shown, the venue kiosk 106 may include various modules components and data stores, such as a check-in module 404 to manage user check-ins, and a concession module 404 to determine concession information for display and to generate notifications (e.g., to a concession stand) regarding the user's arrival, the user's concession order, or the like. In some embodiments, a venue kiosk 106 may include fewer, additional, and/or alternative additional modules, components, and/or data stores than those illustrated in FIG. 4.

Sample Interactions and Data Flows

Figure 5:
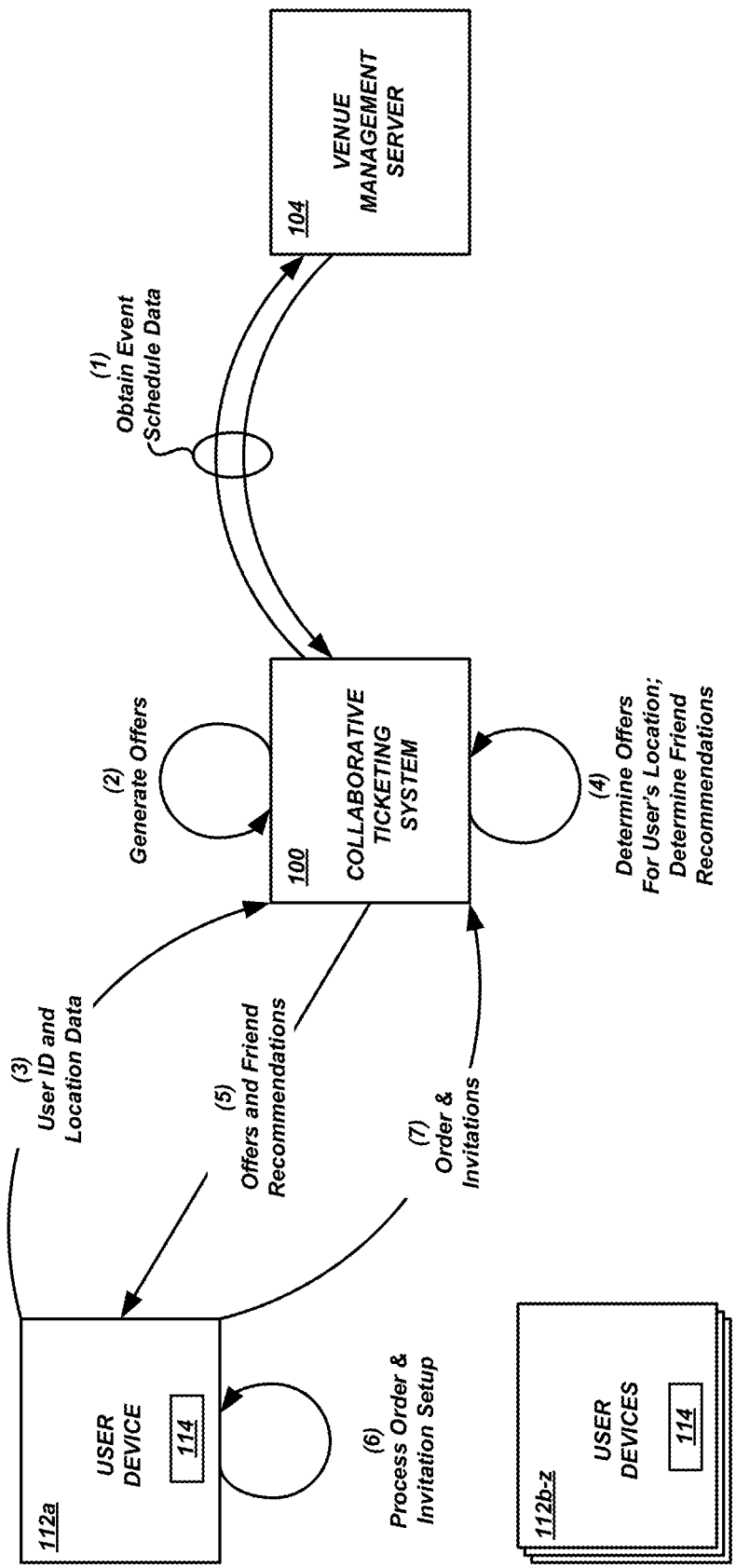
FIG. 5 illustrates example data flows and interactions between user devices, a collaborative ticketing system, and a venue management server according to some embodiments.
Figure 6:
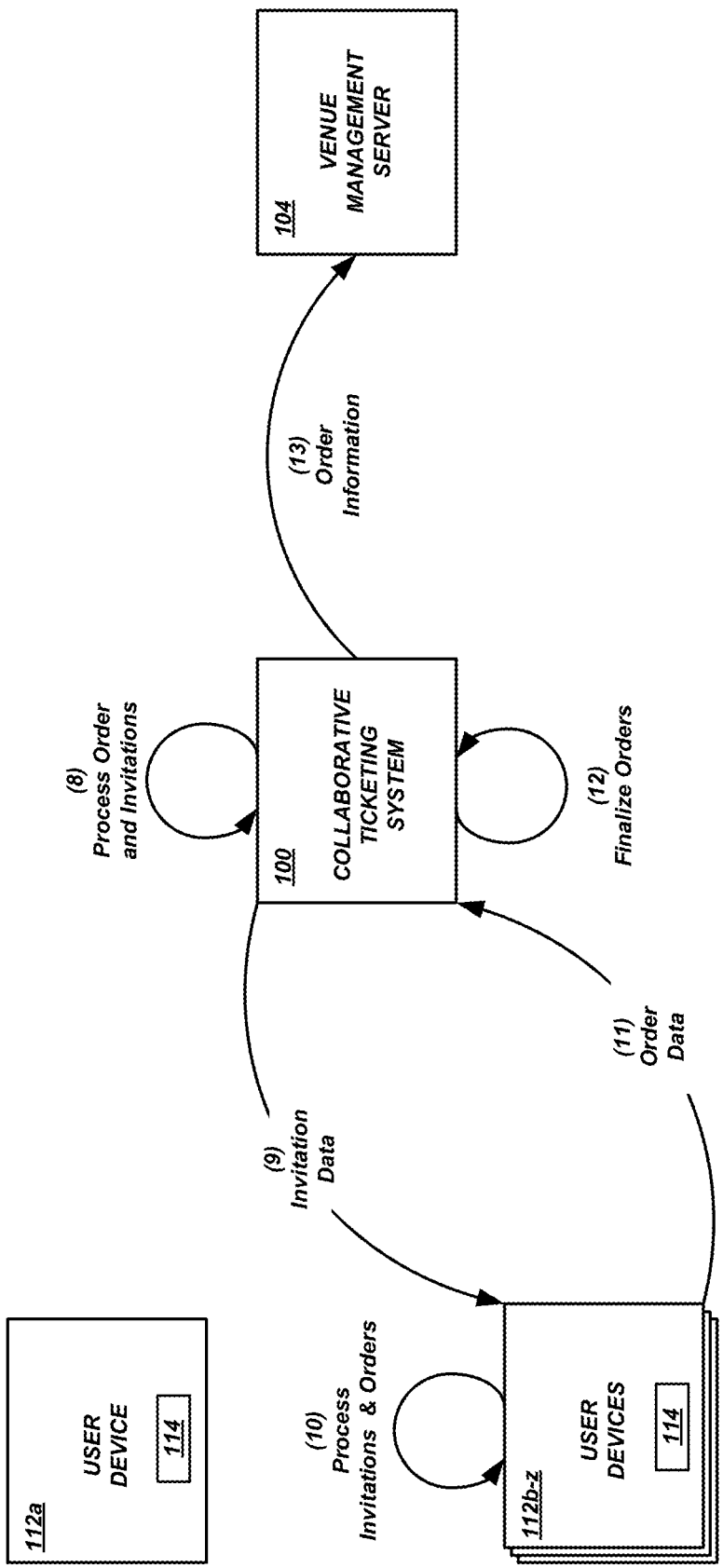
FIG. 6 illustrates additional example data flows and interactions between user devices, a collaborative ticketing system, and a venue management server according to some embodiments.
Figure 7:
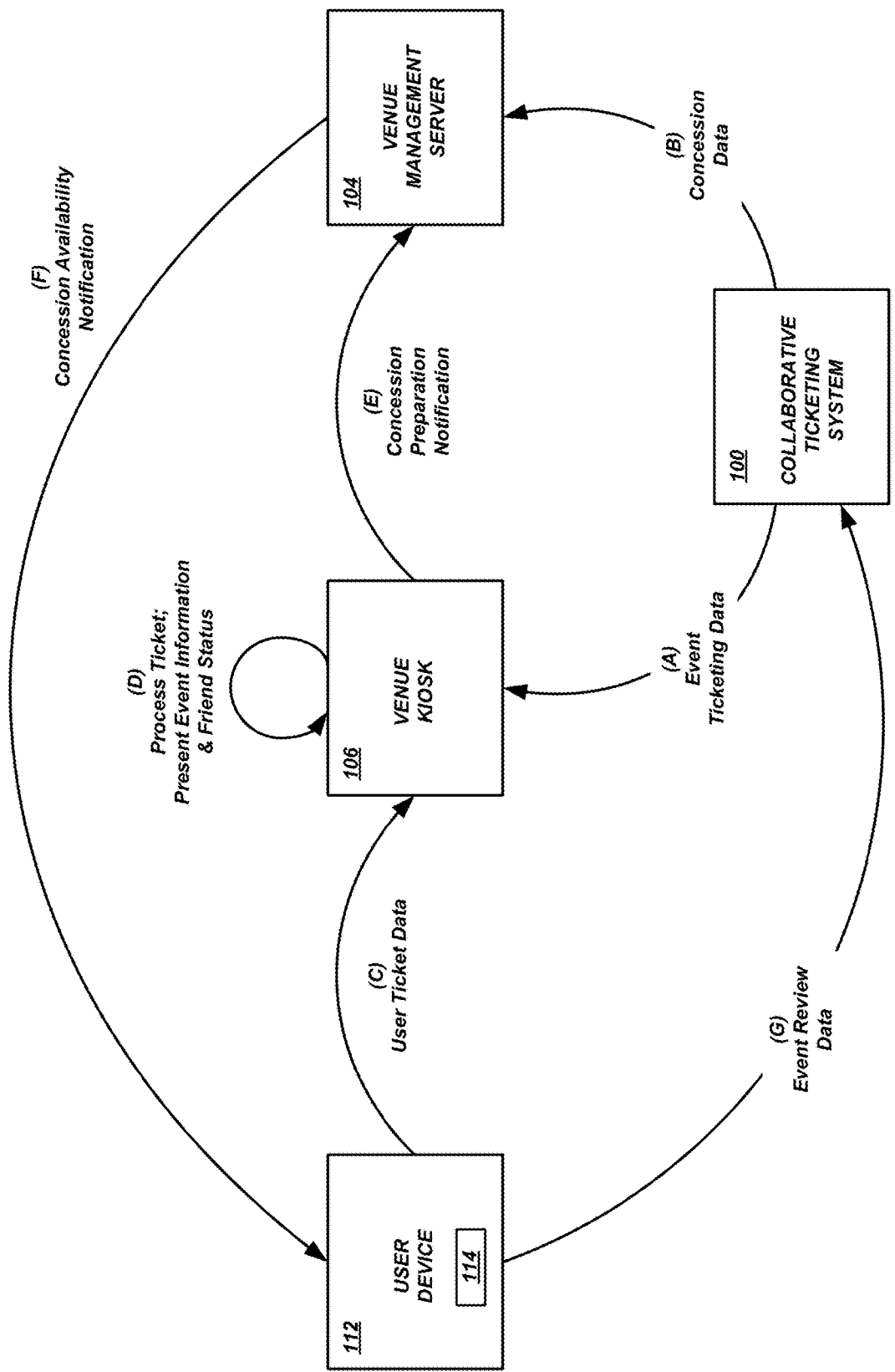
FIG. 7 illustrates example data flows and interactions between a user device, venue kiosk, collaborative ticketing system, and venue management server according to some embodiments.
Figure 8:
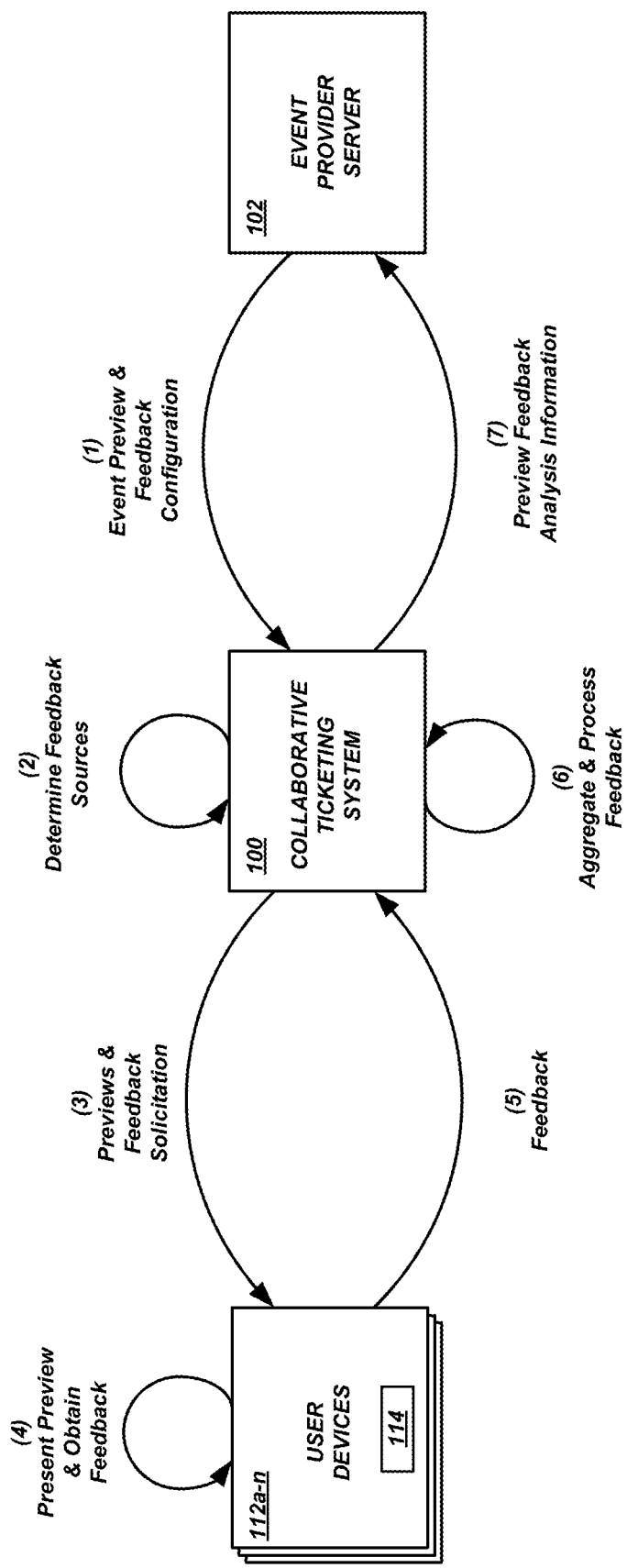
FIG. 8 illustrates example data flows and interactions between a user device, collaborative ticketing system, and event provider server according to some embodiments.

FIGS. 5, 6, 7, and 8 show example interactions between user devices 112, a collaborative ticketing system 100, an event provider server 102, a venue management server 104, and/or a venue kiosk 106. The interactions and data flows shown in FIGS. 5-7 are illustrative interactions and data flows that may occur during or in connection with ticket pricing, order generation, order finalization, ticket redemption, and/or various other processes. For example, the interactions and data flows shown in FIGS. 5-7 may be performed in connection with the processes 900 and 1000 shown in FIGS. 9 and 10. The interactions and data flows shown in FIG. 8 are illustrative interactions and data flows that may occur during or in connection with providing event previews to users and obtaining user feedback regarding the previews.

Figure 9:
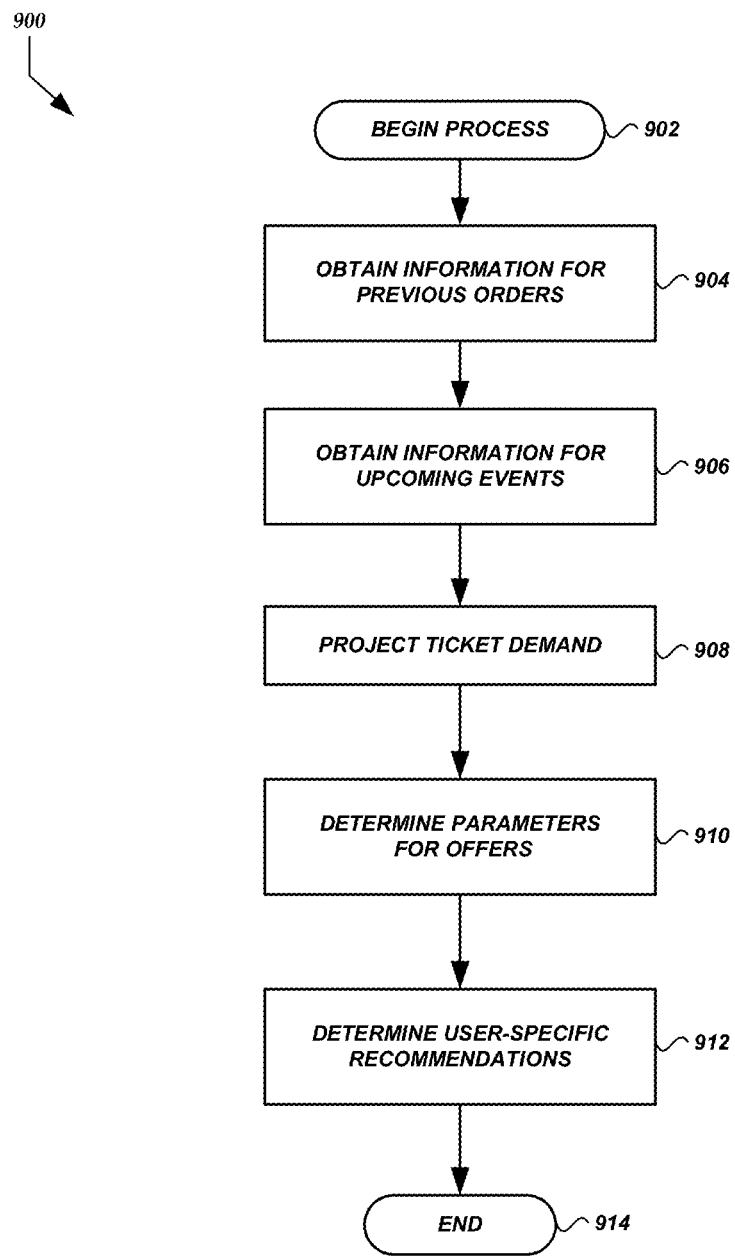
FIG. 9 is a flow diagram of an illustrative process for generating event offers content page according to some embodiments.

With reference to FIG. 5, a collaborative ticketing system 100 may obtain event schedule data from one or more venue management servers 104 at (A), and generate offers for event tickets and related items at (B). The schedule data obtained from venue management servers 104 may include information regarding upcoming showings, ticket availability, concession availability, historical or desired pricing, etc. Such information may be stored in the events data store 200, the venues data store 222, or some other appropriate data store. In some embodiments, the collaborative ticketing system 100 may also obtain, from event provider servers 102 (not shown in FIGS. 5-7), information regarding movies currently shown in theaters, information regarding historical or desired pricing, etc. Such information may be stored in the events data store 200 or some other appropriate data store. The collaborative ticketing system 100 may further maintain data (e.g., in the orders data store 226) regarding prior ticket sales for particular movies and/or at particular locations, sales for related movies, and the like. The collaborative ticketing system 100 may also maintain information regarding user preferences, social connections, and the like (e.g., in the users data store 228). The offer generation module 200 or some other appropriate module or component of the collaborative ticketing system 100 may use any or all of this information to forecast demand and set prices for ticket offers. The collaborative ticketing system 100 may use various statistical techniques, machine learning models, and/or other methods to set prices. Illustratively, prices may be set to maximize or otherwise increase revenue based on expected demand and/or to maximize or otherwise increase demand. Process 900 described below with respect to FIG. 9 is one example of a process that a collaborative ticketing system 100 may use to generate offers, price tickets, and the like.

A user wishing to purchase tickets to a movie or some other event can use a user device 112a to review offers generated by the collaborative ticketing system 100. The user device 112a may include a mobile ticketing application 114 provided by or otherwise associated with the collaborative ticketing system 100 (e.g., a "thick client" implementation), a general web browser application (not shown) to access a web server or application server that is part of or associated with the collaborative ticketing system 100 (e.g., a "thin client" implementation), some combination thereof, etc. Upon application initialization or login, or in response to some other event, the user device 112a may provide a user or account identifier (such as an identifier of the user, application used by the user, or the user device 112a) to the collaborative ticketing system 100 at (C). In addition, the user device 112a can provide location data to the collaborative ticketing system 100. For example, the user device 112a may include a location module 304 (e.g., a GPS antenna and corresponding componentry) that determines the current location of the user device 112a (e.g., latitude and longitude coordinates of the user device 112a), and the user device 112a may provide such data, or data derived therefrom (e.g., a zip code, location name, etc.) to the collaborative ticketing system 100.

The collaborative ticketing system 100 can use the location information to determine which movies are currently showing at theaters near the user and determine the ticket offers for individual showings at (4). The collaborative ticketing system 100 may also obtain information about the movies (e.g., previews, reviews, ratings, etc.) so that such information can be provided to users in order to facilitate the process of choosing from multiple movies, offers, etc. The information may have been previously obtained by the collaborative ticketing system 100 and cached such that it can be quickly provided to user devices 112, or the information may be obtained in response to receipt of a user request such that the most up-to-date information may be obtained.

In some embodiments, the collaborative ticketing system 100 can determine which friends of the user might be interested in the movies or individual showings available near the user's current location. The collaborative ticketing system 100 can then recommend friends and other social network contacts that the user may consider inviting to a selected showing. For example, the social connection module 208 may access various social network services with which a user is associated (e.g., has an account), and add the user's contacts from the individual social network services to a data store (e.g., the users data store 228). In this way, the mobile ticketing application 114 or collaborative ticketing system 100 can access an aggregated contact directory for the user to provide listings of available contacts for group outings, to recommend contacts for group outings, etc. The social network contacts identified by the social connection module 208 do not need to be friends of a user on a social network service (e.g., as managed by a social network server 110), but may include other people with whom the user attends movies, other users of the collaborative ticketing system 100, etc. For example, the social connection module 208 may analyze previous orders 226, usage history 230, and/or other information associated with the user and the user's friends and other social connections. The social connection module 208 can identify friends with whom the user typically attends movies generally, friends with whom the user typically attends movies having particular characteristics (e.g., genres, actors, etc.), friends with whom the user may not have attended a movie recently, friends showing interest in movies currently showing or movies with characteristics similar to those currently showing, etc. The social connection module 208 may use any or all of this and/or other information to determine friend recommendations for the user.

Figure 10:
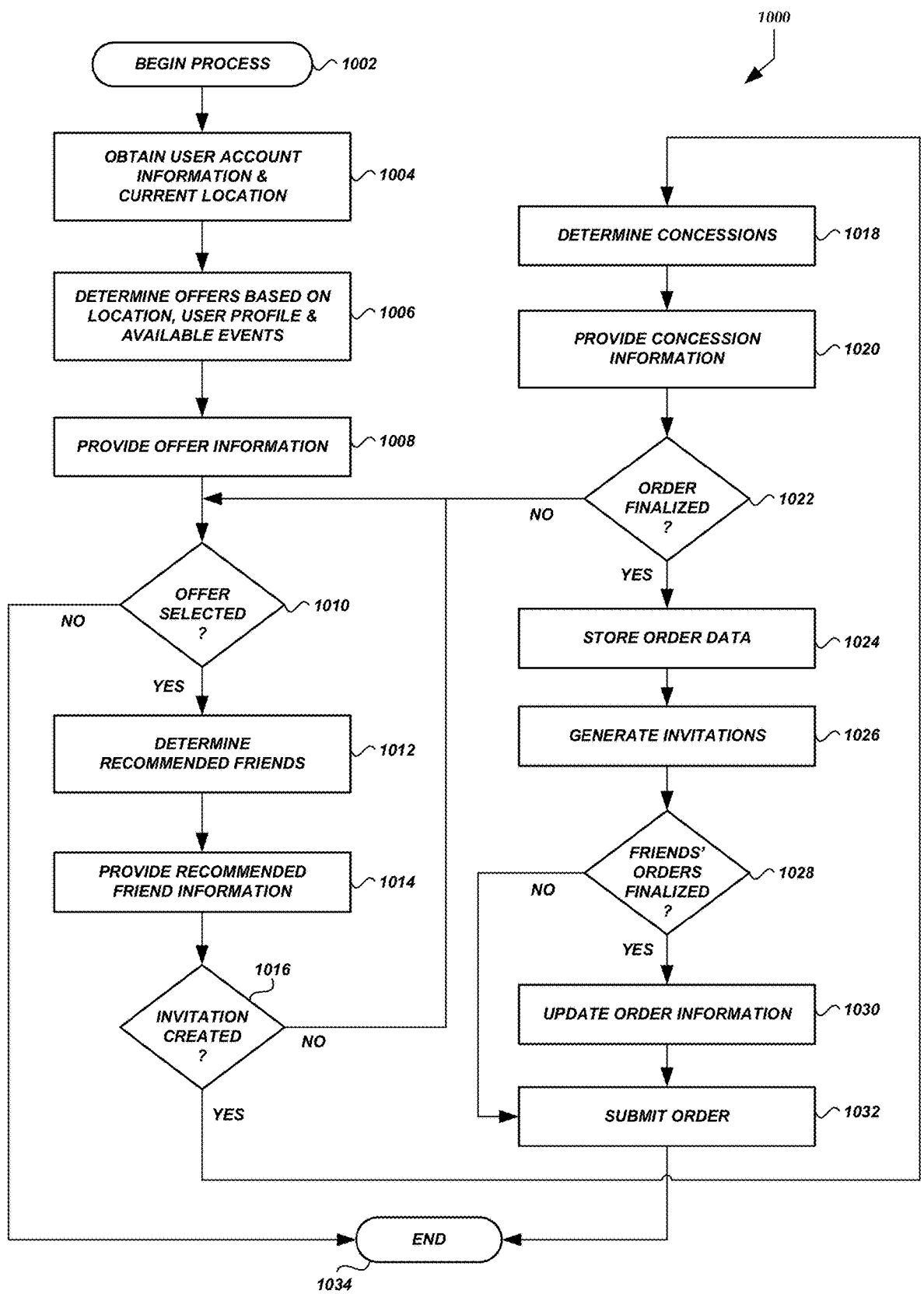
FIG. 10 is a flow diagram of an illustrative process for processing event orders and invitations according to some embodiments.

At (5), the collaborative ticketing system 100 can provide to the user device 112a the offers and friend recommendations determined above and described in greater detail below. In some embodiments the collaborative ticketing system 100 may not provide friend recommendations with offers, by may instead provide friend recommendations after a user selects an offer, or the collaborative ticketing system 100 may not provide friend recommendations at all. Process 1000 described below with respect to FIG. 10 is one example of a process that a collaborative ticketing system 100 may use to provide offers and friend recommendations to users based on the users' current locations, preferences, previous usage, social connections, and the like.

Using the user device 112a, the user can view the movie information and offers, and select a showing at (6). The user may also browse concessions or other event-related items for pre-purchase, as described in greater detail below with respect to FIG. 9. In addition, the user may select friends that the user wishes to invite to the selected showing. The friends may be selected from a contact list kept by the user, from the user's social network profile, from recommendations provided by the collaborative ticketing system 100, or some combination thereof. In some embodiments, the price that the user is charged for a ticket is based at least partly on the friends, invited by the user, also purchasing tickets. For example, the user (and, in some cases, each friend) may get a discount based on the number of friends that purchase tickets in response to the user's invitations. As another example, the user (and, in some cases, particular friends) may get a discount based on which friends purchase tickets in response to the user's invitations. Certain friends may be more likely to influence other invited friends to purchase tickets, or to influence additional users altogether to purchase tickets (e.g., users who may not have been invited or who may not be socially connected to the current user). If the current user invites such an influential friend and that friend subsequently purchases a ticket (and, in some cases, causes other users to purchase tickets), the current user may get an additional discount, reward, or other compensation. As a further example, the user or all participants in a group outing may obtain upgraded tickets or other benefits based on the number of tickets purchased by the group as a whole for the event (e.g., the user or all members of the group may get upgraded seats for the same price they were going to pay for the original seats, the user or all members of the group may get free or upgraded concessions, etc.). The ordering module 310 or some other appropriate component of the user device 112a can select or generate information to purchase the offer and generate the invitations, and can provide such information to the collaborative ticketing system 100 at (7).

In some embodiments, the user may wish to invite friends to a movie, but may also wish to provide multiple (e.g., two or more) options from which the user's friends can select. For example the user may wish to see a movie on a particular day or around a particular time, but may be flexible with respect to the particular movie. As another example, the user may wish to see a particular movie, and may be flexible with respect to date or time such that the user may attend the movie with friends at a time that is convenient for the most friends, or for certain friends. These and other examples may be handled through the use of a poll. The user may use user device 112a to select two or more offers, select friends to poll, and submit the poll. The ordering module 310 or some other appropriate component of the user device 112*a* can select or generate information defining the poll, such as information identifying the movie options, users invited to participate in the poll, the poll deadline, etc. The ordering module 310 can provide such information to the collaborative ticketing system 100 at (7).

With reference to FIG. 6, the collaborative ticketing system 100 can process the order information received from user device 112*a* and generate invitations at (8). For example, process 1000 described below with respect to FIG. 10 is one example of a process that the collaborative ticketing system 100 may use to process orders received from user devices.

The collaborative ticketing system 100 can provide invitations to invited users at (9). Each invited user may be associated with one or more user devices, such as mobile phones, laptop computers, and the like. The collaborative ticketing system 100 can provide invitations directly to the user devices 112*b*-112*z*, such as by communication with a thick-client application executing on user devices 112*b*-112*z* (using, e.g., a push notification to the mobile ticketing application 114), by providing a text message or device-addressable message (e.g., a message prompting the user to view the invitation and including a link to a thick-client application or a thin-client address), etc. In some embodiments, the collaborative ticketing system 100 may provide invitations to user-based addresses rather than specific client devices. For example, the collaborative ticketing system may send an email, add a message to a message center accessible via a thin-client, etc. The specific messaging channels used to send invitations to individual users may be determined on a user-by-user basis, such as via user-configurable preferences stored in the users data store 228.

The invited friends may use user devices 112*b*-112*z* to view and act on invitations at (10). If the invitation is an invitation to purchase a ticket, a receiving user can purchase the ticket. Information about the purchase can be submitted to the collaborative ticketing system 100 at (11). The users may also browse concessions or other event-related items for pre-purchase, as described in greater detail below with respect to FIG. 9. If the invitation is an invitation to vote in a poll, a receiving user can submit a vote. Information about the vote can be submitted to the collaborative ticketing system 100 at (11).

The collaborative ticketing system 100 can finalize the orders or poll at (12). If the invitation was an invitation to vote in a poll, the votes can be tallied and the winning showing or other event can be determined. Notifications may be sent to the user devices 102*a*-102*z*, or just to the originating user device 102*a*. The users may be prompted or enabled to purchase tickets for the wining showing. In some embodiments, the users who voted for the winning showing may automatically have orders entered on their behalf, and other remaining users may be prompted or enabled to purchase tickets. The collaborative ticketing system 100 can also determine final pricing for the orders. For example, the collaborative ticketing system 100 may reduce prices based on the number of users purchasing tickets, as described above.

The collaborative ticketing system 100 can provide order information to a venue management server 104 at (13). The order information may include ticket identifiers, such as bar codes, quick response ("QR") codes, or other unique identifiers that the venues can use to validate user tickets at check-in. The order information may also include information about concessions pre-purchased by the users.

With reference to FIG. 7, an illustrative embodiment will be described in which a user can check in at an event using a venue kiosk 106. In response, concessions and other event-related items pre-purchased by the user can be prepared for pickup before or while the user is on the way to the concession stand or other pickup location. As shown, the collaborative ticketing system 100 can provide event ticketing data to the venue kiosk 106 at (A). The event ticketing data may include ticket identifiers, such as QR codes or other unique identifiers that the venues can use to validate user tickets for particular showings. Event ticketing data may also include information about the users corresponding to the tickets so that the kiosk may display personalized messages, as shown in FIG. 4. In some embodiments, the event ticketing data may be provided to a venue management server 104 instead of the venue kiosk 106 (as described above with respect to FIG. 5) and the venue management server 104 may provide appropriate data to the venue kiosk 106.

The collaborative ticketing system 100 can provide concession data to the venue management server 104 at (B). The concession data may indicate which concessions and/or other event-related items have been pre-purchased. The concession data may also include user and/or ticket identifiers such that the individual concession orders can be tied to a unique user.

At (C), a user may check in at the venue kiosk 106. The user device 112*a* may display ticketing information that can be presented at the venue to gain access to the vent. For example, the user device 112 may display encoded information, such as a code, QR code, or some other unique identifier as shown in FIG. 3. The encoded information may correspond to a ticket to the event purchased by the user of the device 112*a* (e.g., an encoded identifier of the ticket that can be decoded by a kiosk 106 and validated against ticket information provided by the collaborative ticketing system 100). In some embodiments, the encoded ticketing information may include concession information regarding concessions that have been pre-purchased in connection with the ticket. For example, a concessions order can either be encoded in the QR code itself or stored at the collaborative ticketing system 100, venue management server 104, etc. If the concession information is stored on a server (e.g., collaborative ticketing system 100, venue management server 104, etc.) then the information encoded in the QR code may include a reference or identifier for looking up the concession information on the server.

The kiosk 106 may include an optical sensor 402 or some other component capable of reading the identifier displayed by the client device 112 to control entry to the event, venue, etc. The kiosk 106 may verify the ticket identifier using previously-received ticketing information and, upon successful verification, indicate the successful check in to the user. The kiosk 106 may also have access to information regarding which friends of the user have already checked in. For example, ticketing information received by the kiosk 106 may also link tickets or users together based on the invitations, polls, offers, and the like described above to facilitate the presentation of such friend check-in data. In some embodiments, the kiosk 106 may receive friend check-in information from another source, such as the collaborative ticketing system 100. In such cases, the kiosk 106 may display friend check-in information regarding friends that may not have been part of the invitation, poll, or offer with which the current user purchased a ticket. In this way, users can catch up with friends whom they did not know would be at the event. Users may set user-configurable privacy settings to indicate whether their presence at an event is to be displayed to other users in this manner.

In some embodiments, ticketing information may not be provided to the venue kiosks 106 prior to user check-ins. In such cases, venue kiosks 106 may verify that a user has purchased a valid ticket by querying the collaborative ticketing system 100 after the user provides the ticket (e.g., after the user's QR code is scanned). In some embodiments, users may check in using other methods, such as near-field communications, radio frequency identifiers ("RFIDs"), fingerprint scanners, optical scanners, or any other appropriate method. In some embodiments, a user may check in using a user device 112 alone, rather than checking in at a kiosk 106. For example, location data provided by the location module 304 of the user device 112 may be provided to the venue management server 104, collaborative ticketing system 100, or some other system to verify that the user has arrived at the venue, to determine whether the user is within a threshold distance of the venue, will arrive within a threshold period of time, etc. In such cases, a notification may be generated to concessions personnel to begin preparing concessions when the user is within the threshold distance or will arrive within a threshold period of time. The user may also actively submit check-in information, such as by clicking a button or performing some other user interface operation with the user device 112 that confirms check-in or otherwise causes a notification to be sent to the venue management server 104, collaborative ticketing system 100, or some other system.

The concession management module 406 or some other appropriate module or component of the venue kiosk 106 can provide a concession preparation notification or check-in notification at (E). The notification may be notification specifically related to preparation of pre-purchased concessions, and may be provided to a venue management server 104. In some embodiments, the notification may be a check-in notification to the venue management server 104, and the venue management server 104 may have knowledge of pre-purchased concessions or may obtain information regarding pre-purchased concessions from the collaborative ticketing system 100.

The venue management server 104 can cause presentation of the concession notification information (or related information) associated with the user or ticket to appropriate personnel (e.g., display a notification on a screen, play an audible tone or text-to-speech presentation, print a paper notification, etc.). Concession personnel can then prepare the pre-purchased concessions such that the concessions will be ready for pick up when the user arrives at the concession stand, or shortly thereafter. In some embodiments, concessions may be prepared and a user may be notified at (F) when the concessions are available for pickup.

In some embodiments, users may order concessions or other event-related items independently of purchasing tickets. For example, a user may browse event-related item offerings on the user device 112, and purchase the items during the event. The user device 112 may send information regarding the purchase directly to the venue management server 104 or via the collaborative ticketing system 100. When the items are ready to be picked up, a notification can be generated to the user device 112. In some embodiments, the items may be delivered to the user at the event. For example, the venue management server 104 may locate the user based on ticketing information (e.g., seat/row numbers automatically determined based on the user's ticket), seating information provided by the user (e.g., seat/row numbers entered into the mobile ticketing application 114 by the user), geographic location information provided by the user device 112 (e.g., GPS coordinates determined by a GPS component of the user device 112), wireless networking triangulation, or the like.

After attending the movie or other event, the user may submit a review or other related information at (G). For example, the user may record a video or audio review, submit a text-based review, answer questions defined by the movie studio or theater, etc. Data reflecting the recorded or entered review, answered questions, etc. can be stored or generated by the user device 112 and transmitted to the collaborative ticketing system 100. In some embodiments, the collaborative ticketing system 100 may prompt the user to submit a review after the event. For example, the collaborative ticketing system 100 has information regarding the user check-in at the showing. The collaborative ticketing system 100 may wait a predetermined or dynamically determined period of time, or determine that the user is leaving the venue based on location information provided the user device 112, etc. The collaborative ticketing system 100 can then prompt the user for a review.

The review may include information about events depicted in the movie (e.g., important plot developments) that other users may not wish to know about prior to seeing the movie ("spoilers"). The user submitting the review may indicate that the review contains spoilers (e.g., by selecting a particular user interface option, by including a "spoiler" keyword, etc.). An indication may then be shown to other users warning them of the spoiler, or the review may be obscured when shown to other viewers and an option may be given to the other viewers to be shown the review contents (instead of showing the review contents by default). In some embodiments, other users reading a review may tag the review as containing a spoiler (e.g., by selecting a user interface option). Upon receipt of one (or a threshold number) of such "spoiler" tags for a given review, the collaborative ticketing system 100 and/or application 114 may implement various options, such as obscuring the review contents, indicating the review contains a spoiler, etc., as described above.

In some embodiments, users may select pre-generated tags to describe the movie or to indicate qualities of the movie. For example, users may choose one or more descriptive words or phrases, such as "action packed," "fun," "funny," "romantic," "dark," "disappointing," "thrilling," etc. Subsequent users (e.g., friends of the users who have chosen the tags, or users of the system 100 in general) may then be shown a listing of the top-chosen tags and, in some cases, corresponding selection frequencies or percentages. Alternatively or in addition, users may post such tags to social networking sites, microblogging sites, etc. from within the application 114 or outside of the application 114. The collaborative ticketing system 100 may access such tags, even when posted outside of the application 114, and compile them for viewing by other users as described above. Illustratively, the tags may be "hashtags."

With reference to FIG. 8, a collaborative ticketing system 100 may obtain event previews from event provider servers 102, and solicit feedback from users regarding the previews. Illustratively, the previews may be movie trailers provided by the movie studios distributing the movies to theaters. The movie studios may wish to obtain feedback regarding the effectiveness of different version of trailers, the interest of different types of users in the trailers, the interest of users in trailers for particular movies with respect to others, etc.

At (1), an event provider server 102 can provide one or more event previews to the collaborative ticketing system 100. In addition, the event provider server 102 can configure the type of feedback to be solicited in connection with the preview, the type of users from which to solicit the feedback, etc. Information regarding such configuration may be referred to as feedback configuration information. In some embodiments, the collaborative ticketing system 100 may provide a user interface with which to define such feedback configuration, such as a "thick client" application or a browser-based interface. Illustratively, a representative of a movie studio can access the interface, upload video files of trailers, define or select the questions that users are to be asked or the feedback that is to be solicited, and/or select incentives or rewards to be provided to users (e.g., free/discounted tickets or concessions, movie club points, etc.). Thus, the system or device that provides the event preview and feedback configuration information does not need to be a "server," but may instead be any computing device, such as a personal computer, tablet computer, mobile phone, etc.

At (2), the preview management module 210 or some other module or component of the collaborative ticketing system 100 can determine or select sources of feedback for the preview. The sources of feedback may be a selection of users with particular characteristics (e.g., demographic characteristics, application 114 usage histories, order histories, event interests, prior event attendance, etc.) defined by or selected by the event provider server 102. In some cases, the feedback sources may be chosen based on criteria determined by the collaborative ticketing system 100, or may be randomly selected by the collaborative ticketing system 100.

At (3), the preview management module 210 or some other module or component of the collaborative ticketing system 100 can provide the previews to user devices 112*a-n*, corresponding to the users selected above, and solicit feedback from the users of the devices 112*a-n*. In some embodiments, users of the user devices 112*a-n* may view previews and provide feedback in return for discounts, movie club points, and other incentives. The users may access a portion of the application 114 (or browser-based interface) and request previews to watch. The collaborative ticketing system 100 can select the previews for the particular user based on the feedback configuration, random choice, etc. as described above, and provide them to the user. In some embodiments, the collaborative ticketing system 100 may actively solicit feedback from the users. For example, the collaborative ticketing system 100 may transmit messages (e.g., text messages, email messages, push notifications, alerts displayed with in the application 114, etc.) that alert the users to new previews. As another example, the collaborative ticketing system 100 may transmit previews and feedback solicitation information (e.g., questions) to the user devices 112*a-n* when the application 114 or collaborative ticketing system 100 determines that the user devices are idle, connected to a Wi-Fi connection, etc.

At (4), the applications 114 (or browser-based interfaces) executing on the user devices 112*a-n* can present event previews and obtain feedback from users. The feedback may be the form of one or more questions (e.g., "Do you think this movie will be funny? What genre does this movie fit into? Would you see this movie? Will you go to see this movie on opening night? If so, would you like to reserve a seat now?") In some embodiments, the feedback may be in the form of free-form text, a selection of which movie/preview was best, a ranking or rating the movies/previews, etc. In some embodiments, the users may be asked preliminary questions, such as whether they know the identities of the main actors (e.g., the application 114 may display photos of the main actors and ask a user to identify one or more of the actors), whether the user has ever heard of the movie, whether the user saw the previous installment in the series, whether the user has seen competitor movies, what types of movies the user likes, etc. Based on any of the these and/or other factors, a particular preview may then be chosen to show the user (e.g., movie studios may perform A-B testing in which users are shown one of multiple different versions of a particular preview or one of multiple different previous for a particular movie, and then solicited for feedback regarding the particular version/preview that each saw).

At (5), the applications 114 (or browser-based interfaces) can provide feedback information to the collaborative ticketing system 100 reflecting user responses to the previews. In some embodiments, the feedback information may include additional information, such as contextual information (e.g., information regarding what the user did in the application 114 before and/or after watching the preview and providing feedback), orders (e.g., ticket purchases and/or group outings initiated for the movies previewed), etc.

At (6), the preview management module 210 or some other module or component of the collaborative ticketing system 100 can aggregate and process the feedback information received from multiple user devices 112*a-n*. Feedback information may be anonymized, summarized, or otherwise processed in a way that can be useful to event providers without sacrificing the privacy of the users. In some embodiments, the feedback information is not anonymized. For example, if a user opts-in to providing personally identifiable information, then the feedback information provided to event providers may include user profile information collected and generated by the collaborative ticketing system 100, information about the user's social connections, etc. The preview management module 210 or some other module or component of the collaborative ticketing system 100 can provide the information to the event provider server 102 at (7).

Information generated during the preview process described herein may be used by the application 114 and/or collaborative ticketing system 100 in other ways. For example, positive and negative feedback regarding particular previews or types of previews may be used when generating user-specific offers, as described in greater detail below. As another example, the collaborative ticketing system 100 may automatically generate invitations, or recommend a list of movie candidates from which a user may select to initiate a group outing, recommend a list of group member candidates from which a user may select to initiate a group outing, etc. The automatically generated invitations or recommendations may be based on feedback provided regarding previews (e.g., a user gave positive feedback regarding similar movies or movies starring the same actor or directed by the same director), user-indicated interest in particular movies (e.g., a user answered "yes" to "Do you plan on seeing this movie when it is released?"), feedback provided by other users (e.g., candidate users), etc.

Sample Offer Generation Process

FIG. 9 shows an illustrative process 900 for generating event offers. Advantageously, the collaborative ticketing system can use information received from event providers and/or venues, information regarding prior offers and orders, information regarding user interests and social connections, and/or other data or some combination thereof to generate event offers. The offers may be generated to increase demand for events, increase revenues, etc.

The process 900 begins at block 902. The process 900 may be performed by the offer generation module 200 or some other module or component of the collaborative ticketing system 100. Illustratively, although the process 900 will be described below with respect to a single offer generation module 200, the process 900 may be performed by multiple computer processors of a server computing device ("server") or multiple servers, in parallel or asynchronously. For example, offer generation for events in different geographic regions may be performed by different servers or groups of servers during off-hours (e.g., between 2:00 AM and 5:00 AM in the respective geographic regions). As another example, offer generation for different categories of events (e.g., different movie genres or different types of entertainment events generally) may be performed by different servers or groups of servers substantially in parallel, etc.

At block 904, the offer generation module 200 or some other module or component of the collaborative ticketing system 100 can obtain order information regarding previously-completed purchases. The previously-completed purchases may include purchases of offers for previously-occurring events and/or upcoming events. The collaborative ticketing system 100 may store order information in the orders data store 226 for orders occurring during some previous window of time, or indefinitely.

At block 906, the offer generation module 200 or some other module or component of the collaborative ticketing system 100 can obtain information for upcoming events. The collaborative ticketing system 100 may obtain such information from, e.g., event provider servers 102, venue management servers 104, independent event information servers 108, social network servers 110, and/or other sources. For example, the collaborative ticketing system 100 may obtain information about movies from the movie studios (via event provider servers 102) that have released or are releasing the respective movies, such as the titles, ratings, subject matter, actors, directors, pricing, previews and other promotional materials, etc. The collaborative ticketing system 100 may obtain information about particular showings from the theaters or operators of the theaters at which the showings will occur (via venue management servers 104), such as scheduled dates and times of upcoming showings, theater locations, internal theater numbers, pricing, available concessions, etc. The collaborative ticketing system 100 may obtain third-party or independently-produced information about movies (via event information servers 108 and/or social network servers 110), such as reviews and other commentary.

At block 908, the offer generation module 200 or some other module or component of the collaborative ticketing system 100 can project demand for tickets to the various events for which it is generating offers. The projected demand may be based on any number of factors, such as previous ticket purchases (e.g., for the same movie, for similar movies, etc.), information regarding the particular showings available (e.g., dates, times, locations, etc.), information regarding the interests of users of the system 100 (e.g., prior ticket purchases for similar movies, an expressed interest in the particular movie for which demand is being project or in similar movies, interest shown by users located in the same geographic region as the theaters, etc.), pricing objectives provided by the movie studios and/or theaters, price sensitivity of users who may be interested in the movie, and the like. As one example, ticket sales for a particular movie may be plotted on a curve, or a function describing such a curve may be determined. The ticket sales for today, tomorrow, or some point in the future may be based on a value the curve is expected to take on the respective day. This baseline projection can be adjusted up or down based on other factors such as the release of other movies, the occurrence of holidays, an expected additional increase or decrease due to the day of the week, etc. In some embodiments, information from event information servers 108 and/or social network servers 110 can reflect growing or waning interest in the movie outside of historical projections, and the projected demand can be adjusted accordingly. For example, the occurrence of some event, such as increased commentary on social networks, an award nomination, or the like may cause a surge in demand for tickets to a small-budget movie near the expected end of its theater run.

At block 910, the offer generation module 200 or some other module or component of the collaborative ticketing system 100 can determine parameters for the ticket offers that it is generating. The parameters may be based at least partly on any of the information or factors described above, such as projected demand, pricing targets, etc. In some embodiments, an offer may include any number of parameters in addition to the identity and time of the event for which the offer is being generated. For example, an offer may include a base price that corresponds to the starting price of the tickets in connection with the offer (which may in some cases be lower than the list price typically charged to customers for tickets independent of any special offer or discount) and a discount amount or function that corresponds to the discount applied to offered tickets when friends also purchase tickets (such as a set discount amount or percentage for each additional friend, tiered discount levels that increase at one or more thresholds, etc.). A floor price may also be determined, corresponding to the lowest amount the tickets will be sold for in connection with the offer (such as the per-capita minimum to be paid to the movie studio, possibly including some additional amount or percentage to be paid to the movie theater and/or charged by the provider of the system 100).

The offer parameters may be set to maximize an expected outcome with respect to the number of ticket sales, total revenue, and/or total profits for a particular showing, particular day, particular film, particular theater, etc. For example, the base prices and/or incremental discounts for additional friends may be set fairly aggressively for less-popular movies with matinee showings during weekdays, while the base/price and/or incremental discounts may be set more conservatively for prime time weekend showings of popular new movies.

In some embodiments, the offer may include concessions or other items, services, or incentives bundled with one or more tickets, such as taxi or other transportation services, restaurant reservations, and the like. The pricing of the tickets, concessions, and other items, services, or incentives may be adjusted to: maximize revenue and/or profits for one or both; provide an incremental sale; meet pricing expectations (e.g., per capita minimums of the movie studios and desired revenue per customer for the theaters), etc. The user may be presented with a single price for the bundle, and the prices of individual components may be dynamically set by the offer generation module 200 to produce the desired outcome. In addition to setting the prices of the individual components to produce the desired outcome, the split of revenue between the movie theater and movie studio for each component of the bundle may be set to produce the desired outcome. Illustratively, the movie studio may be given all revenues derived from tickets sold in connection with the offer, and the movie theater may be given all revenues derived from concessions sold in connection with the offer. Thus, although the movie theater may be giving up some ticket-related revenue, it may be increasing overall profits due to the incremental sale of high-profit-margin concessions that may not otherwise have been sold. In addition, although the movie studio may take less than its typical per capita minimum requirement, it may nevertheless be increasing overall profits due to the incremental ticket sale that may not otherwise have been made.

At block 912, the offer generation module 200 or some other module or component of the collaborative ticketing system 100 can determine user-specific recommendations. In some embodiments, user-specific profile information, such as event interests, prior purchases, and the like may be used to select offers to recommend to the user or to groups of users. For example, users who may have expressed an interest in a particular movie but never went to see the movie (e.g., the users went to see other movies instead, or the users are price-sensitive and prior movie ticket offers were outside of their price range). A user-specific or group-specific recommendation may be made to such users to bring their attention to a potentially desirable offer, such as an offer that is within a user's price range for a movie in which the user expressed interest. The recommendation may be made in the form of a targeted message (e.g., an email or text), an advertisement displayed within the application 114, an option in a "recommendations" portion of the application interface 114, such as the wheel described in greater detail below, etc. In some embodiments, the offer may include recommended friends to invite to the movie, or the offer may be communicated to the entire group of recommended friends such that the group can see who has received the recommended offer.

The offers generated according to the process 900 may be stored in an offers data store 224 or some other appropriate data store of (or accessible to) the collaborative ticketing system 100.

Sample Order Management Process

FIG. 10 shows an illustrative process 1000 for managing orders for event tickets and other items. The process 1000 begins at block 1002. The process 1000 may be performed by the order management module 202, invitation generation module 204, and/or some other module or component of the collaborative ticketing system 100. Illustratively, although portions of the process 1000 will be described below with respect to execution or performance by particular modules or components of the collaborative ticketing system 100 (e.g., an order management module 202 and an invitation generation module 204), the process 1000 or portions thereof may be performed by additional, fewer, or alternative module or components, multiple modules in parallel or asynchronously (e.g., multiple computer processors of a server or by multiple servers), etc.

At block 1004, the collaborative ticketing system 100 can obtain user account information and current location information from a user device 112. Illustratively, the user account information and/or current location information may be obtained when a user launches the mobile ticketing application 114 on a user device 112 and the mobile ticketing application 114 causes account information and/or location information to be transmitted to the collaborative ticketing system 100. The location information may include geo-location coordinates, a zip code, or some other data reflecting the current location of the user device 112, an identifier or coordinates of a predefined "home" location for the user, an identifier or coordinates of user-specified or queried location, etc.

At block 1006, the order management module 202 or some other module or component of the collaborative ticketing system 100 can determine offers to be provided to the user device 112. The offers may be determined based on the location information, the profile of the user associated with the account information obtained above, and the events available near the location indicated by the location information. Illustratively, venues (e.g., movie theaters) may be selected within a particular distance or travel time of the current location of the user device 112. For example, the x closest venues (where x is any non-negative integer) from a distance or travel time standpoint may be selected. As another example, certain venues may be excluded even though they meet the distance/time criteria (e.g., because they are showing movies available at theaters closer to the current location, because the user has provided unfavorable feedback regarding the venue, etc.). Certain venues may be added even though they do not meet the distance/time criteria (e.g., because they are showing movies of interest to the user that are not showing at any closer theater, because they user has provided favorable feedback or marked them as a "favorite theaters," etc.). In some embodiments, the order management may select offers based on the user's indicated interests or profile data, based on the status of the offer as an offer recommended for the user, etc.

At block 1008, the order management module 202 or some other module or component of the collaborative ticketing system 100 can provide offer information to the user device, such as descriptions of the offers, promotional material associated with the offers, etc.

At decision block 1010, the order management module 202 or some other module or component of the collaborative ticketing system 100 can determine whether an offer has been selected. If so, the process 1000 can proceed to block 1012. For example, user selection of a particular offer in the user interface described below may cause information reflecting the selection to be transmitted to the collaborative ticketing system 100.

At block 1012, the order management module 202 or some other module or component of the collaborative ticketing system 100 can determine whether there are any friends to recommend for the currently selected offer. Illustratively, the recommended friends for a particular offer may be determined based on the current user's social connections, history of ordering tickets and attending movies with particular users, etc.

At block 1014, the order management module 202 or some other module or component of the collaborative ticketing system 100 can provide recommended friend information to the user device 112. For example, the order management module 202 can provide images of or associated with the friends, information linking the friends to particular offers or movies, etc. The user device 112 may display such friend information to the user as described in greater detail below.

At decision block 1016, the order management module 202 or some other module or component of the collaborative ticketing system 100 can determine whether an invitation has been created for the selected offer. If so, the process 1000 can proceed to block 1018. As described above, the invitation may be an invitation to a particular event or to purchase a particular offer, or the invitation may be an invitation to participate in a poll to select an event.

At block 1018, the order management module 202 or some other module or component of the collaborative ticketing system 100 can identify or otherwise determine which concessions are available for the particular offer, at the particular venue, etc. As described above, some offers may include bundled concessions, and the bundled concessions can be added to the current order. However, users may still purchase additional concessions if desired. In some embodiments, concessions may be recommended for a user. For example, the user may typically purchase a particular concession or group of concessions (e.g., medium popcorn and medium drink). The system can provide a recommendation of those concessions, recommendations of other concessions that the user may be interested in (e.g., based on an analysis of similar user provides), discounts on the typically-purchased concessions, discounts on larger sizes of the typically-purchased concessions, etc.

At block 1020, the order management module 202 or some other module or component of the collaborative ticketing system 100 can provide the concession information to the user device 112. The concession information may include descriptions, prices, images, special offers, etc.

At decision block 1022, the order management module 202 or some other module or component of the collaborative ticketing system 100 can determine whether the order has been finalized for this particular user. If so, the user's payment may be authorized for the amount of the order, pending any possible discounts that may be applied if friends, invited by the user, also finalize orders for the offer.

At block 1024, the order management module 202 or some other module or component of the collaborative ticketing system 100 can store order data, such as data in the orders data store 226 indicating the offer selected, the amount pre-authorized, etc.

At block 1026, the invitation generation module 204 or some other module or component of the collaborative ticketing system 100 can generate invitations to friends or other users selected to be invited as described above and in greater detail below. The invitation generation module may reserve tickets for the invited friends for some predetermined or dynamically determined period of time, or until the occurrence of some event. For example, a user may set a period of time within which users should purchase tickets, and tickets for all invited friends (or some portion of invited friends) may be reserved until the expiration of that period of time. In some embodiments, as also described in greater detail above, the invitation may be an invitation to participate in a poll rather than an invitation to a specific movie.

At decision block 1028, the order management module 202 or some other module or component of the collaborative ticketing system 100 can determine whether any friends, invited by the current user, have finalized orders. If so, the process 1000 can proceed to block 1030, where the orders for the users are updated to reflect the final price (e.g., a per-friend discount is applied). Alternatively, or in addition, if a poll was generated, the order management module 202 may total the results of the poll and finalize orders for users that voted for the winning event/offer (and other users that subsequently decide to attend the winning event/offer).

At block 1032, the order management module 202 or some other module or component of the collaborative ticketing system 100 can submit the finalized order. In submitting the order, the order management module 202 can finalize payment. In addition, as described above, the collaborative ticketing system 100 can provide information about the tickets, concessions, and related purchases to the venue management server 104 for the venue that is hosting the event, to the venue kiosk 106, etc.

Sample User Interface

Example user interface screens of one embodiment of the mobile ticketing application 114 will now be described with reference to FIGS. 11A-11C, 12A-12C and 13A-13I. The user interface illustrated in these drawings is a touch-based interface designed to operate on a smartphone, tablet, or similar mobile device that includes a touch screen. The mobile ticketing application 114 generates the displayed screens and views using information retrieved by the mobile application/device from the system 100.

Figure 11C:
FIGS. 11A-11C illustrate user interface screens for viewing event details according to some embodiments.
Figure 11B:
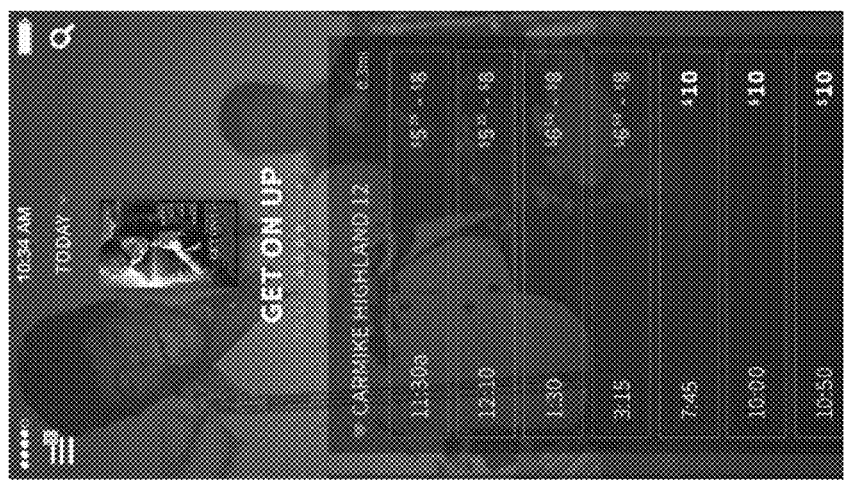
Figure 11A:
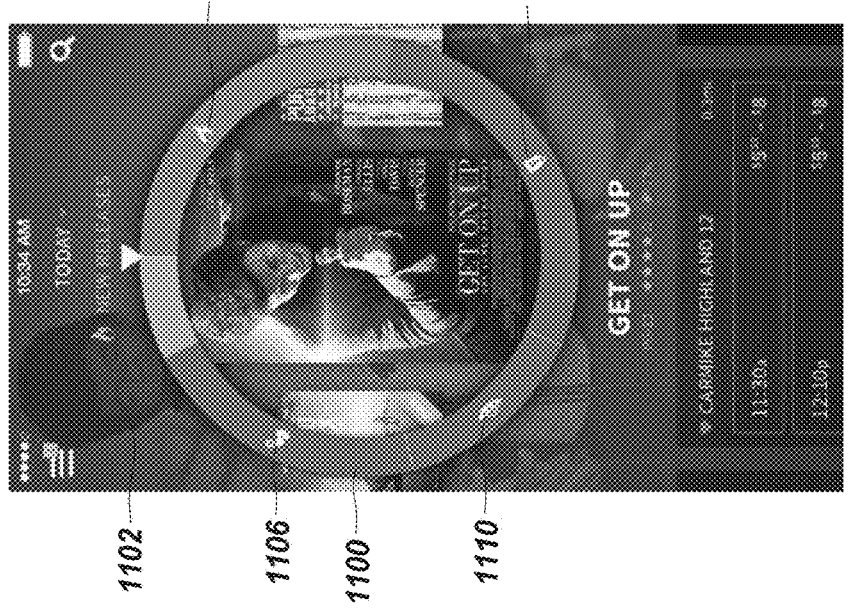

FIG. 11A illustrates a "navigation wheel" feature 1100 of the user interface. The navigation wheel 1100 is an interactive display element that the user can rotate via a drag or swipe gesture to explore movies showing in the vicinity of the user. The movie featured at the center of the wheel ("Get On Up" in FIG. 11A) changes as the wheel is rotated. While viewing the wheel display, the user can swipe up on the screen to view show times for the displayed movie at a local theater (as shown in FIG. 11B), and can swipe to the right to see additional theaters and corresponding show times.

If the user taps on the center of the wheel 1100 while a particular movie is displayed, the user is presented with a movie-specific display of the type shown in FIG. 11C. This movie-specific display indicates (1) which of the user's friends have indicated that they want to see this movie, and (2) which friends have already seen it (and the average rating assigned by these users). From this movie-specific display screen of FIG. 11C, the user can perform various actions, including (1) selecting "I saw it," in which case the mobile application 114 prompts the user to rate the movie, (2) selecting "I want to see it," (3) selecting "plan an outing," in which case the user enters into a pipeline (described below) for planning an outing to see the movie, and (4) swiping the menu bar 1108 to the left to move from the "friends" view to views of show times, reviews, additional movie information, and a trailer.

Referring again to FIG. 11A, the wheel 1100 in this example is divided into four sections, each of which is represented by a respective icon on the wheel. The size of each section is proportional to the number of movies or other events within that section. In addition, or alternatively, the size of each section may be proportional to the degree of the user's interest in the movies or other events within that section (e.g., as determined based on prior ticket purchases, prior user-expressed interest, prior user interactions with the mobile ticketing application 114, user interactions with social networks, etc.). Sections for movies in which the user may be most interested may be larger and correspond to more movies than other sections in which the user may be relatively less interested in. For example, a "special offers" or "deals" section may be bigger (and have more items) if the user is determined to be particularly price-sensitive, while a "new releases" section may be bigger for users who are not price-sensitive and who like to attend movies soon after they are released. As described below, the number and types of sections displayed may be personalized by the system 100 for the user. The arrow 1102 at the top of the wheel 1100 points to the currently selected section. In FIG. 11A, the user is browsing the "new releases" section, which is represented by the flame icon 1104. The user can scroll through the various new releases by rotating the wheel in either direction within this section.

The icon 1106 represents a "recommendations for you" section. When this section is selected, the user is presented with personalized recommendations of movies. These personalized recommendations are preferably based, at least partly, on ratings assigned by the user to particular movies. Other data reflective of the user's movie preferences, such as the user's ticket purchase history and the movie preferences of the user's friends, may additionally be considered.

The icon 1110 in FIG. 11A represents a "movies that your friends want to see" section. This section is displayed on the wheel when at least one of the available movies is a movie that a friend of the user has designated as a movie they want to see. (The system automatically clears a user's "I want to see it" designation if the user purchases a ticket for the movie or indicates that they have seen it.) The user can efficiently discover movies that the user's friends want to see, and discover which friends want to see such movies, by browsing within this section.

The icon 1112 in FIG. 11A represents "movie deals." This section of the wheel displays movies for which one or more theaters are currently offering a discount or special offer.

Various other sections may be displayed on the wheel 1100, including sections corresponding to specific movie genres and categories (e.g., kids movies) for which the user has exhibited a preference. The system 100 may automatically select which sections to display to a user based on the user's behaviors and/or based on explicit preferences specified by the user. A given movie may be included in multiple sections of the wheel.

Figure 12C:
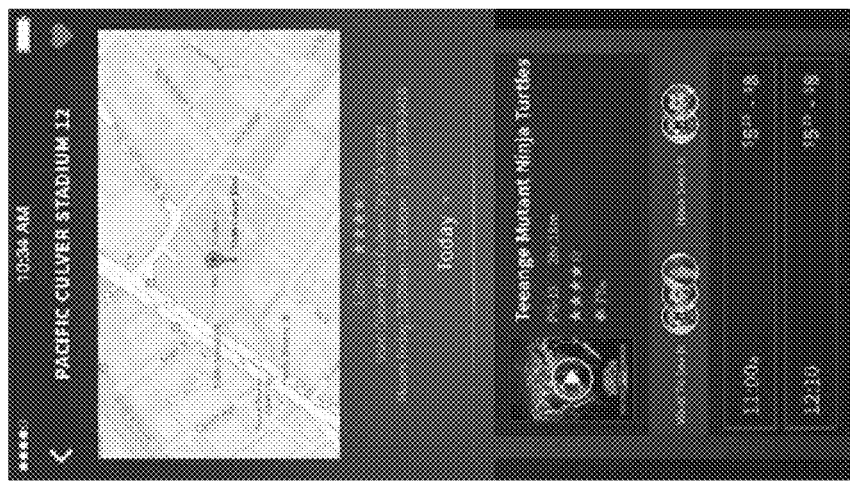
FIGS. 12A-12C illustrate additional user interface screens for viewing event details according to some embodiments.
Figure 12B:
Figure 12A:
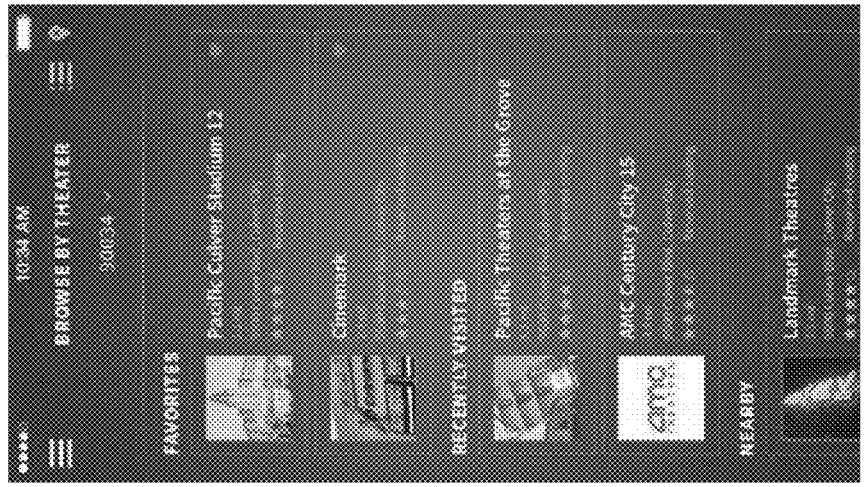

FIG. 12A illustrates a screen for browsing movies by theater. The listed theaters are arrange into the categories "favorites" (based on the user's explicit designations of favorite theaters), "recently visited," and "nearby." The "recently visited" theaters may be determined by the system 100 based on ticket purchase histories and/or based on GPS-based tracking of the mobile devices 112. The user can toggle from the list view shown in FIG. 12A to a map view as shown in FIG. 12B. The map view shows the location of each nearby theater.

When the user selects a theater from the list view or map view, the mobile application 114 displays a theater-specific view (FIG. 12C) for the selected theater. This theater-specific view allows the user to view the theater's movies and associated show times, and enables the user to, among other actions, initiate the planning of an outing to the theater. As shown in FIG. 12C, the theater-specific view also displays information about which friends want to see each movie and which have already seen it.

In some embodiments, additional and/or alternative methods may be used to search for movies, theaters, etc. For example, a user may type suggestions into a search box, or a transcription of a user's utterance may be entered into the search box. As the user types or speaks, filtered results may be presented that correspond to the search box entry. Illustratively, the filtered results may be represented by movie art, such as promotional images provided by the respective movie studios for the films. In some embodiments, the movie art may be a still image or other representation of a preview that can be viewed upon activation by a user.

Figure 13C:
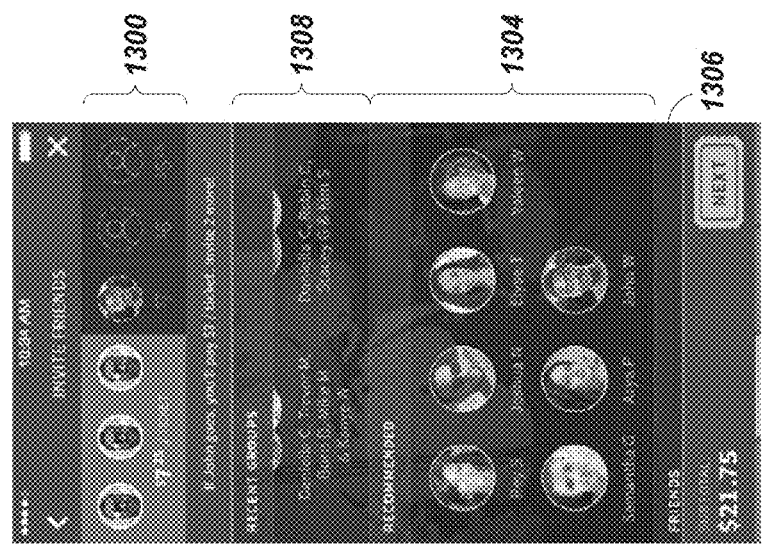
FIGS. 13A-13I illustrate user interface screens for ordering event tickets according to some embodiments.
Figure 13B:
Figure 13A:
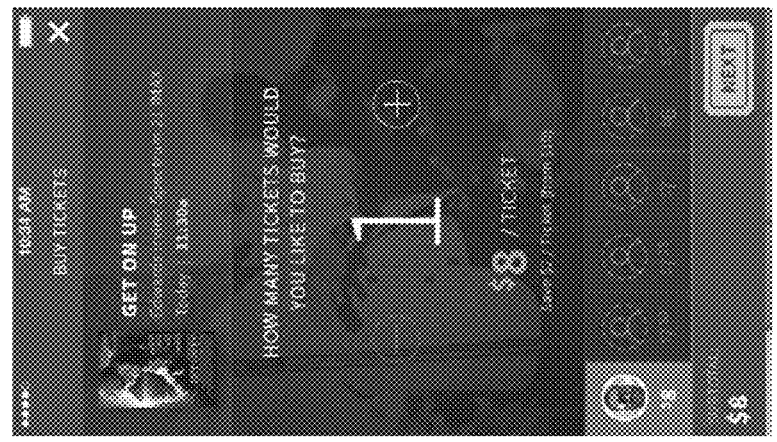

FIGS. 13A-13H illustrate an example pipeline (screen flow) for planning an outing to see a selected movie at a selected theater, and also illustrates a use case example in which a user plans an outing and makes a purchase. The user can access the "plan an outing" pipeline from various views, such as the movie-specific view of FIG. 11C. As shown in FIG. 13A, the user can tap on the plus and minus signs to increase or decrease the number of tickets to be purchased. As shown in FIGS. 13A and 13B, the price per ticket drops as the number of tickets increases. The outing summary section 1300 indicates the amount of the discount for various numbers of tickets.

In the illustrated embodiment, the discount depends not only on the number of tickets the user purchases, but also on the number of invited friends who accept the invitation to purchase a ticket. For example, and as shown later in this example (see FIG. 13H), the user may purchase three tickets for his party and may invite two friends; in this scenario, the user will pay $7.25 per ticket (the discounted amount for a group purchase of three) if neither friend accepts the invitation, $7 per ticket if one friend accepts, and $6 per ticket if both friends accept. In some use case scenarios (not shown), the user interface may also present the user with other incentives for inviting friends; for example, a free fountain drink or popcorn may be offered for reaching an outing size of four people.

In the screen shown in FIG. 13B, the user has opted to purchase three tickets for himself, as represented by the three images of the user's face. In FIG. 13C, the user has scrolled down to access functionality for inviting one or more friends, and has selected one friend to invite. The user can select additional friends to invite by tapping on the images of particular friends in either the "recommended" section 1304 or the "friends" section 1306 below it, causing the selected friend's image to be added to the outing summary section 1300. In some embodiments, once a friend has been added (as in FIG. 13C), the user can drag the friend's image to the left into the shaded portion of the summary section 1300, if desired, to indicate that the user will pay for the friend's ticket. In the present example of FIGS. 13A-I, the user does not opt to pay for the tickets of any invited friends.

The friends shown in the "recommended" section 1304 may be selected by the system 100 based on various criteria, such as (1) which friends currently have an "I want to see it" designation for the movie, (2) which friends have already seen the movie, as determined from their ticket purchases, ratings, and explicit indications that they have seen it, (3) which friends the user has previously invited (or invited the most frequently) through the system 100, and/or (4) the movie preferences of the individual friends. As one example, the system 100 may display in the "recommended" section 1304 all friends who have not yet seen the movie and who meet at least one of the following conditions: (1) the friend has an "I want to see it" status for the movie, (2) the friend has previously been invited by the user to a movie outing via the system, (3) the friend's predicted affinity for the movie, as determined by a recommendation algorithm, exceeds a selected threshold. In some embodiments, the user interface may display, for each recommended friend, the reason(s) the friend was selected to recommend; for example, the user interface may display an indication, such as an icon, label, or other visual effect indicative of the reason. The indication may be displayed by default, or it may be displayed when the user double taps on the image of the recommended friend. An example of a reason might be "Because John indicated that he wants to see this movie," or "Because John has given high ratings to other movies like this one."

As illustrated in FIG. 13C, a "recent groups" section 1308 enables the user to invite a group of two or more friends. (The images of the groups in this example our are only partially visible, and would be fully visible when the user scrolls down). The groups displayed in this section 1308, if any, are groups recently invited to a movie by the user (as tracked by the system 100). If the user taps on a group (not illustrated), all members of the group are added to the outing and displayed in summary section 1300.

Figure 13F:
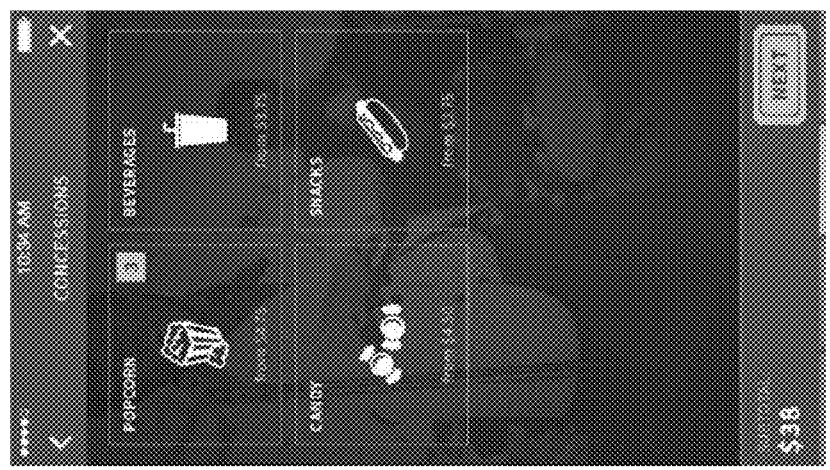
Figure 13E:
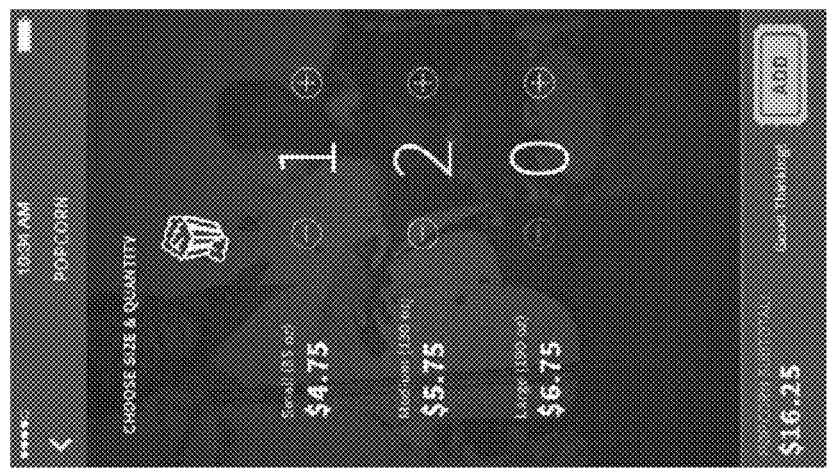
Figure 13D:
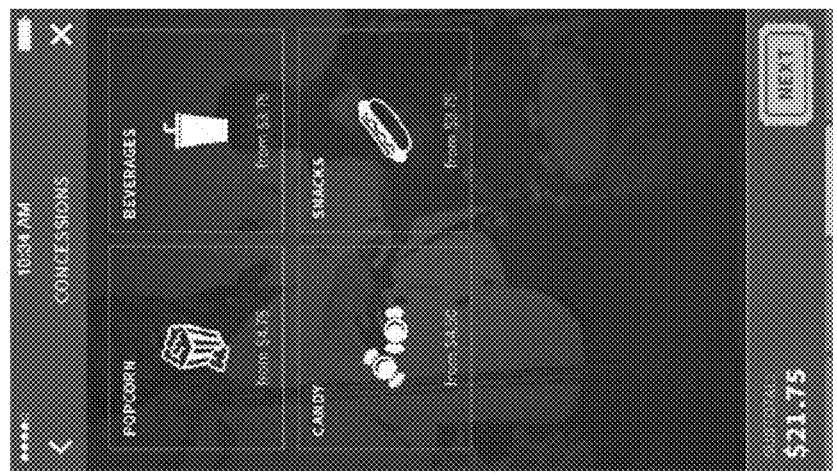

Once the user has finished selecting friends to invite, the user can select the "next" button to proceed to the concessions view of FIG. 13D. From this view, the user can, if desired, select a concessions category. In FIG. 13E, the user has selected the "popcorn" category and has selected three popcorn items to add to the order. As with ticket purchases, the system may, in some embodiments, offer various types of volume discounts on concessions. The discounts on concessions, if any, may also depend on the number of tickets being purchased. Upon selecting "add" in FIG. 13E, the selected items are added to the order and an updated concessions view (FIG. 13F) is presented.

Figure 13I:
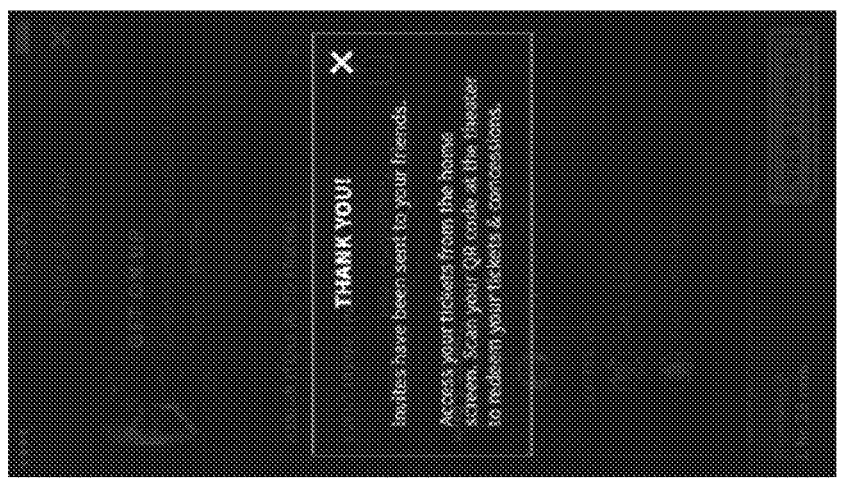
Figure 13H:
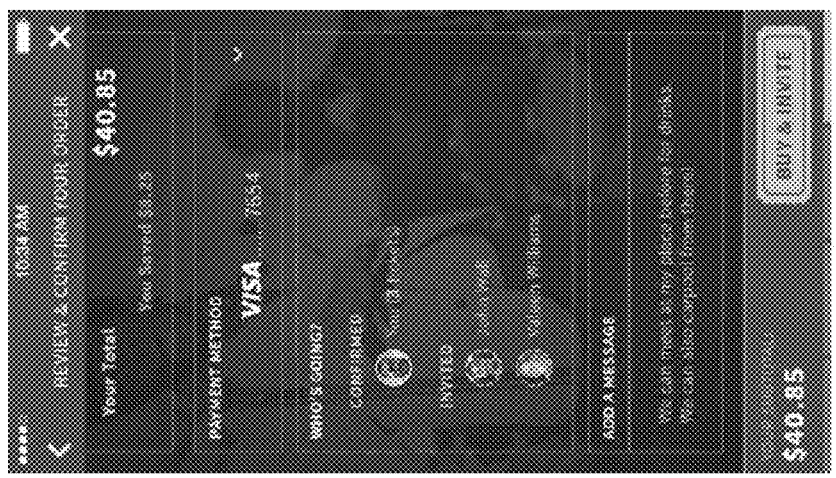
Figure 13G:
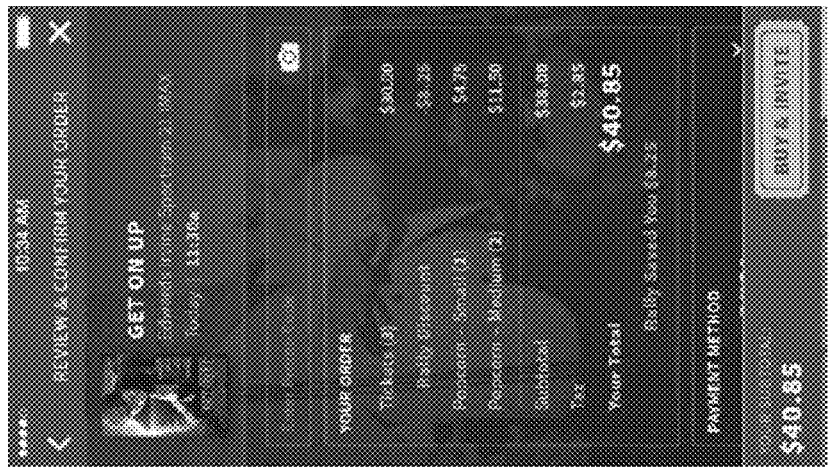

In this use case example, the user selects "next" in FIG. 13F to proceed to the "review and confirm your order" view of FIGS. 13G and 13H. This view identifies the selected movie, the number of tickets being purchased by the user, the invited friends, and the selected concessions, and includes transaction information for completing the purchase. The view also includes an "add a message" option (FIG. 13H) for the user to compose a message to the invited friends. The order total ($40.85) in this embodiment is calculated based on non-attendance of the invited friends, and is the amount used by the system 100 for seeking credit card authorization of the transaction. If one or both invited friends accept the invitation and purchase a ticket, the amount charged to the user's credit card will be less than this amount (to reflect the increased volume discount).

FIG. 13I displays the messaging presented to the user once the user selects the "buy and invite" button to complete the transaction. As indicated by the messaging, the user can later use the mobile ticketing application 114 to display a QR code at the theater. The QR code contains encoded transaction information identifying the purchased tickets and concessions, and thus allows the theater to process the order (including preparing any concessions order upon the user's arrival).

As further illustrated by the messaging in FIG. 13I, the system 100 also sends invitation messages to the invited friends. In one embodiment, these invitation messages are sent as text messages or iMessages, although they may alternatively be sent by email or another communications method. The invitation messages may be transmitted by the collaborative ticketing system 100 to the invitees (the mobile ticketing application 114 may cause the collaborative ticketing system 100 to send the messages by, e.g., providing information or a notification to the collaborative ticketing system 100 to do so), or they may be transmitted from a user device 112 to another user device 112 without being routed through the collaborative ticketing system 100. The message may include a link to a browser-based interface provided by the collaborative ticketing system 100 (e.g., a link to a web page), a link to launch the application 114 on the recipient's user device 112, etc. The following is an example invitation message: "John Smith has invited you to see Fury at 7:15 tonight at AMC Century City with Valeen W & Elyse T. Join here: http://mov.ie/fesx." When the invited friend selects the link, they are presented with a web page that provides an option to create an account with the service or to log into their existing account. In some embodiments, the application 114 may be launched or activated, and the user may log in to the user's account via the application 114 or be automatically logged into the application 114. The invited user is also given the option to purchase a ticket. In one embodiment, if the invited friend purchases a ticket via the service's web site without using the mobile ticketing application, the ticket (which includes a QR code) is sent to the invited friend via a text message and/or email.

The user whom set up the group outing may view an interface (not shown) that displays which users have accepted invitations to the movie or completed an order for tickets. For example, the interface may include an image for each invited friend. Presentation of an image may be altered to indicate that the corresponding friend has purchased tickets. Illustratively, the interface may show updates in real time or substantially real time, such as within seconds of a friend completing a purchase. In some embodiments, friends in receipt of an invitation to a movie may also see an interface that shows them which friends have been invited, which friends have accepted invitations or completed orders for tickets, etc.

A similar interface may also be shown when the invitation is an invitation to participate in a poll. Images corresponding to individual friends may be shown, and polling status may be indicated (e.g., which movie/showing they voted for, or whether they have voted at all). For example, a user may plan a night out by initiating a poll of selected/recommended friends. The interface can prompt the user to pick a date/time, select individual events (e.g., particular movies generally, or individual showings of movies), sort/rank the events by the user's attendance preference, etc. In some embodiments, the collaborative ticketing system 100 can make smart recommendations for each of the poll settings based on, e.g., who is being polled, location of the user and/or friends, past application usage and other recorded behaviors, current inventory, time of day, etc. The user (and, optionally, each polled friend or some subset thereof) may access a screen or other interface that shows the current poll status, such as which friends have responded to the poll, which events they have voted for, the events for which they indicated that they are available, the time remaining before the poll closes, etc. When a poll closes, the price of individual tickets can vary based on how many polled users (and/or which individual users) purchase tickets, as described in detail above.

Although not illustrated in the example screen displays, the service may also include various features for facilitating the outing. For example, the service may effectively set up a private chat room through which the outing participants can post messages to each other. As another example, the mobile application may display arrival status information for each member of the group, as determined based on ticket scanning events at the theater. As a further example, the mobile application may provide an interface for arranging transportation, such as: providing options allowing group members to indicate their respective availability to drive and to select subsets of the group for carpools; providing options for purchasing or viewing available public transportation; providing options for hiring transportation (e.g., taxi cabs, limousines, etc.); and the like. In some embodiments, users may track the location of selected transportation methods via GPS data provided by respective mobile phones or vehicles.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 800 and 900 described with respect to FIGS. 8-9 may be embodied in a set of executable program instructions stored on one or more non-transitory computer-readable media, such as one or more disk drives or solid-state memory devices, of the user device 112 or a computing system with which the collaborative ticketing system 100 is associated. When a process 800 or 900 is initiated, the executable program instructions can be loaded into memory, such as RAM, and executed by one or more processors of the user device or computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A non-transitory computer readable medium having stored thereon a mobile ticketing application configured to run on a mobile device of a user, said mobile ticketing application comprising:

a user interface module that provides a touch-based user interface on the mobile device, the user interface providing functionality for the user to at least:

browse movies and show times at theaters in a vicinity of the mobile device;

select a movie and an associated theater and show time;

initiate a group event in connection with the selected movie, theater and show time, wherein initiating the group event comprises selecting, from a display of contacts, a set of one or more contacts to invite to the group event, wherein the touch-based user interface provides functionality for the user to select the set of contacts by at least (1) tapping on a selectable representation of a previously invited group of contacts, said group comprising a plurality of contacts, whereby the user can select the plurality of contacts to invite without individually selecting each of the plurality of contacts, and (2) tapping on selectable representations of individual contacts, including individual contacts that are not included in said previously invited group; and a group event processing module that is responsive to initiation of the group event by at least initiating an electronic transmission of an invitation to each selected contact, said invitation including a link to a server system that provides functionality for the invited contact to accept the invitation.

2. The non-transitory computer-readable medium of claim 1, wherein the mobile ticketing application is additionally configured to display, on the mobile device, an encoded display representing a ticket for attending the group event, said encoded display including encoded information corresponding to the group event, said encoded display adapted to be scanned at the theater and used to control entry into the theater.

3. The non-transitory computer readable medium of claim 1, wherein the user interface displays a wheel that is rotatable by the user with a swipe gesture to browse the movies, wherein the wheel has multiple sections, each of which corresponds to a different respective movie category.

4. The non-transitory computer readable medium of claim 3, wherein one of the sections of the wheel is a recommendations section that displays personalized movie recommendations for the user, said personalized recommendations based at least partly on ratings assigned by the user to specific movies.

5. The non-transitory computer readable medium of claim 1, wherein the user interface displays, for at least some of the contacts, respective indications of whether the contacts have already seen the selected movie.

6. The non-transitory computer readable medium of claim 1, wherein the user interface displays, for at least some of the contacts, respective indications of whether the contacts have indicated an interest in seeing the selected movie.

7. The non-transitory computer readable medium of claim 1, wherein the user interface displays recommendations of contacts for the group event, the recommendations of contacts based on at least one or more of the following: (1) which contacts the user has previously invited to at least one group event, (2) which contacts have indicated an interest in seeing the movie, (3) movie preferences of the contacts.

8. The non-transitory computer readable medium of claim 1, wherein the mobile ticketing application determines a price per ticket of the group event based at least partly on a number of attendees.

9. The non-transitory computer readable medium of claim 1, wherein the user interface module additionally provides user functionality to pre-order concessions for the group event.

10. The non-transitory computer-readable medium of claim 1, wherein the selectable representation of the previously invited group comprises names and images of the plurality of contacts.

11. The non-transitory computer-readable medium of claim 1, wherein the touch-based user interface displays selectable representations of each of a plurality of previously invited groups.

12. The non-transitory computer-readable medium of claim 1, wherein the touch-based user interface comprises:

a first section that displays selectable representations of previously invited groups, including said previously invited group;

a second section that displays selectable representations of individual contacts recommended by the mobile ticketing application for the group event; and a third section that displays selectable representations of additional individual contacts;

said first, second and third sections being usable in combination to select the set of one or more contacts to invite to the group event.

13. A system that provides an event ticketing service, comprising:

a mobile ticketing application that runs on mobile devices of users, the mobile ticketing application providing a touch-based user interface that includes functionality for a user to browse events at local venues, select an event at a venue, select a set of one or more contacts to invite to the selected event, and initiate a group outing to the event, wherein the touch-based user interface provides functionality for the user to select the set of contacts by at least (1) tapping on a selectable representation of a previously invited group, said previously invited group comprising a plurality of contacts, whereby the user can select the plurality of contacts to invite without individually selecting each of the plurality of contacts, and (2) tapping on designations of individual contacts, including individual contacts not included in the previously invited group; and a server system that communicates with the mobile devices and interacts with the mobile ticketing application, said server system storing service account information of users, and storing information regarding group outings initiated by users;

wherein the system is responsive to initiation of the group outing by sending, to each selected contact, an invitation message containing information about the selected event and a link for accessing the server system and joining the group outing.

14. The system of claim 13, wherein the system is additionally programmed to generate, for respective members of the group outing, an encoded display that is adapted to be displayed on the mobile device of the member and scanned at the venue to control entry into the venue.

15. The system of claim 14, wherein the user interface further includes functionality for the user to purchase, prior to the event and in connection with the group outing, one or more concession items for pick-up at the event, wherein the system is responsive to scanning of the encoded display at the event by communicating an order for the one or more concession items to concessions personnel at the venue.

16. The system of claim 13, wherein the invitation message comprises a text message or an application notification.

17. The system of claim 13, wherein user selection of the link causes activation of the mobile ticketing application or activation of a browser application.

18. The system of claim 13, wherein the system is programmed to determine a monetary amount per ticket for the group outing based at least partly on a number of members of the group outing.

19. The system of claim 13, wherein the selectable representation of the previously invited group comprises names and images of the plurality of contacts.

20. The system of claim 13, wherein the touch-based user interface displays selectable representations of each of a plurality of previously invited groups.

21. The system of claim 13, wherein the touch-based user interface comprises:

a first section that displays selectable representations of previously invited groups, including said previously invited group;

a second section that displays selectable representations of individual contacts recommended by the mobile ticketing application for the selected event; and a third section that displays selectable representations of additional individual contacts;

said first, second and third sections being usable in combination to select the set of one or more contacts to invite to the selected event.

\* \* \* \* \*